US012362986B2

(12) United States Patent
Evans

(10) Patent No.: US 12,362,986 B2
(45) Date of Patent: *Jul. 15, 2025

(54) SYSTEMS AND METHODS FOR PROVIDING MANAGED SERVICES

(71) Applicant: OPEN TEXT SA ULC, Halifax (CA)

(72) Inventor: Rhys Christopher Evans, Aliso Viejo, CA (US)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,112

(22) Filed: Mar. 15, 2024

(65) Prior Publication Data

US 2024/0250862 A1    Jul. 25, 2024

Related U.S. Application Data

(63) Continuation of application No. 17/751,407, filed on May 23, 2022, now Pat. No. 11,985,024, which is a
(Continued)

(51) Int. Cl.
*H04L 41/046* (2022.01)
*G06F 9/54* (2006.01)
(Continued)

(52) U.S. Cl.
CPC .............. *H04L 41/046* (2013.01); *G06F 9/54* (2013.01); *G06F 21/53* (2013.01);
(Continued)

(58) Field of Classification Search
None
See application file for complete search history.

(56) References Cited

U.S. PATENT DOCUMENTS

| 11,985,167 B2 | 5/2024 | Beckman |
| 12,069,097 B2 | 8/2024 | Beckman |

(Continued)

FOREIGN PATENT DOCUMENTS

| WO | WO-2013075490 A1 * | 5/2013 | ......... H04L 12/4633 |
| WO | WO 2014047168 A1 | 3/2014 | |

OTHER PUBLICATIONS

Notice of Allowance issued by the United States Patent and Trademark Office for U.S. Appl. No. 17/392,118, Mar. 22, 2024, 8 pgs.
(Continued)

*Primary Examiner* — Younes Naji
(74) *Attorney, Agent, or Firm* — Sprinkle IP Law Group

(57) ABSTRACT

Embodiments improve application gateway architecture by pushing secure managed service boundaries. Managed services that were previously available directly in application gateway code are separated from application gateway code and exposed to service clients in a controlled, secured manner via a RESTful API layer dedicated to the management and interaction of deployed managed services. The separation can be realized in management agents. A management agent receives a service request from an application and makes an API call to the dedicated management API layer of the managing application gateway. The application may run within a managed container on a user device. Responsive to the API call, the application gateway sends a control or configuration message to the management agent over HTTP. The management agent controls or configures the managed service to function or behave as dictated by the application gateway.

20 Claims, 10 Drawing Sheets

Related U.S. Application Data continuation of application No. 15/442,302, filed on Feb. 24, 2017, now Pat. No. 11,388,037.

(60) Provisional application No. 62/299,626, filed on Feb. 25, 2016.

(51) Int. Cl.

| | |
|---|---|
| *G06F 21/53* | (2013.01) |
| *H04L 9/40* | (2022.01) |
| *H04L 67/02* | (2022.01) |
| *H04W 4/60* | (2018.01) |
| *H04W 12/08* | (2021.01) |
| *H04W 12/30* | (2021.01) |
| *H04W 12/37* | (2021.01) |

(52) U.S. Cl.
CPC .......... *H04L 63/0281* (2013.01); *H04L 67/02* (2013.01); *H04W 4/60* (2018.02); *H04W 12/08* (2013.01); *H04W 12/35* (2021.01); *H04W 12/37* (2021.01); *G06F 2209/541* (2013.01); *H04L 63/0227* (2013.01)

(56) References Cited

U.S. PATENT DOCUMENTS

| | | | |
|---|---|---|---|
| 2005/0027887 A1* | 2/2005 | Zimler | H04L 12/2816 709/229 |
| 2007/0211034 A1 | 9/2007 | Griffin | |
| 2007/0238488 A1 | 10/2007 | Scott | |
| 2008/0163112 A1 | 7/2008 | Lee | |
| 2010/0011060 A1 | 1/2010 | Hilterbrand | |
| 2010/0088696 A1 | 4/2010 | Stoev | |
| 2010/0202450 A1* | 8/2010 | Ansari | H04L 63/08 370/389 |
| 2011/0202853 A1 | 8/2011 | Mujkic | |
| 2013/0086639 A1* | 4/2013 | Sondhi | H04W 12/068 726/4 |
| 2014/0230042 A1* | 8/2014 | Moore | H04L 63/02 726/12 |
| 2014/0317293 A1* | 10/2014 | Shatzkamer | G06F 9/45558 709/226 |
| 2014/0358715 A1* | 12/2014 | Frydman | G06Q 30/04 705/40 |
| 2014/0365648 A1* | 12/2014 | Haraszti | H04L 41/02 709/224 |
| 2014/0372509 A1* | 12/2014 | Fausak | H04L 67/02 709/203 |
| 2017/0048204 A9* | 2/2017 | Barton | H04L 67/10 |
| 2025/0039241 A1 | 1/2025 | Beckman | |

OTHER PUBLICATIONS

Braswell, Byron, Siegel, Marc, and Wu, Le Gang, Enabling the on Demand Store with IBM Store Integration Framework, Third Edition, IBM, IBM.com/redbooks, Feb. 2007, 704 pgs.

Notice of Allowance issued by the U.S. Patent and Trademark Office for U.S. Appl. No. 17/392,131, Apr. 5, 2023, 13 pgs.

Fengli, Zhang, Xinggoa, He, Zhiguang, Qin, Zhao, Mingtian, "Location Management in Mobile Environment," 2004 Int'l Conf. on Communications, Circuits and Systems (IEEE Cat. No. 04EX914), IEEE, vol. 2, 2004, pp. 1491-1496.

Office Action issued by the U.S. Patent and Trademark Office for U.S. Appl. No. 18/328,718, Sep. 19, 2024, 42 pgs.

Notice of Allowance issued by the U.S. Patent and Trademark Office for U.S. Appl. No. 18/328,718, Mar. 24, 2025, 12 pgs.

\* cited by examiner

FIG. 11A

| | | | Show/Hide | List Operations | Expand Operations |
|---|---|---|---|---|---|
| adminAPI-useradmin | | | | | |
| adminAPI-userProfile | | | Show/Hide | List Operations | Expand Operations |
| adminAPI-users | | | Show/Hide | List Operations | Expand Operations |
| deploymentsServiceAPI : Provides deployments with Gateway services | | | Show/Hide | List Operations | Expand Operations |
| deploymentsServiceAPI-auth | | | Show/Hide | List Operations | Expand Operations |
| POST | /auth/{appName}/handlers | Register auth handlers with the Gateway | | | |
| GET | /auth/{appName}/user | Retrieve a user | | | |
| GET | /auth/{appName}/users/{userName}/groups | Retrieve the identifiers for the groups a user belongs to | | | |
| GET | /auth/{appName}/users/{userName}/profile | Get a users profile | | | |
| deploymentsServiceAPI-email | | | Show/Hide | List Operations | Expand Operations |
| POST | /email/{appName}/important/send | Send an important email to multiple recipients, this is an async endpoint so you can wait for a response regarding the outcome | | | |
| POST | /email/{appName}/send | Send an email to multiple recipient, fire and forget style | | | |
| deploymentsServiceAPI-management | | | Show/Hide | List Operations | Expand Operations |
| GET | /manage/{appName}/eimconnectors | Retrieve the list of available (enabled) EIM connectors currently registered with the Gateway | | | |
| POST | /manage/{appName}/eimconnectors | Register an EIM connector with the Gateway | | | |
| GET | /manage/{appName}/enabled | Ask the Gateway if a specific app is enabled | | | |
| POST | /manage/{appName}/register | Allow the deployments to tell us that it successfully started | | | |

TO FIG. 11B

FROM FIG. 11A

| Method | Endpoint | Description | |
|---|---|---|---|
| POST | /manage/{appName}/status | Allow an Appworks service (not app) to tell us whether id deployed correctly or not. | |
| GET | /manage/{appName}/zipDownloadPermitted | Ask the Gateway if a specific mobile app can be downloaded directly by a client | |
| deploymentsServiceAPI-notifications | | | Show/Hide \| List Operations \| Expand Operations |
| POST | /notifications/{appName} | Send a notification to users or clients | |
| GET | /notifications/{appName}/seqBounds | Get the sequence numbers of the Gateways oldest and most recent notification event | |
| deploymentsServiceAPI-settings | | | Show/Hide \| List Operations \| Expand Operations |
| GET | /settings/{appName}/{settingKey} | Retrieve a configuration setting | |
| POST | /settings/{appName}/{settingKey} | Add a configuration setting | |
| PUT | /settings/{appName}/{settingKey} | Update a configuration setting | |
| POST | /settings/{appName}/{settingKey}/listeners | Register for remote updates to a configuration setting | |
| deploymentsServiceAPI-trustedServers | | | Show/Hide \| List Operations \| Expand Operations |
| GET | /trustedProviders/{appName} | List the currently registered trusted servers/providers | |
| GET | /trustedProviders/{appName}/{name} | Get a trusted server by name, or create one if it a provider for the supplied name does not exist | |
| mobileAPI : Mobile client support features | | | Show/Hide \| List Operations \| Expand Operations |
| mobileAPI-mdm | | | Show/Hide \| List Operations \| Expand Operations |
| mobileAPI-messagingConfig | | | Show/Hide \| List Operations \| Expand Operations |

FIG. 11B

SYSTEMS AND METHODS FOR PROVIDING MANAGED SERVICES

CROSS-REFERENCE TO RELATED APPLICATION(S)

This application is a continuation of, and claims a benefit of priority under 35 U.S.C. 120 of, U.S. patent application Ser. No. 17/751,407 filed May 23, 2022, issued as U.S. Pat. No. 11,985,024, entitled "SYSTEMS AND METHODS FOR PROVIDING MANAGED SERVICES," which is a continuation of Ser. No. 15/442,302 filed Feb. 24, 2017, issued as U.S. Pat. No. 11,388,037, entitled "SYSTEMS AND METHODS FOR PROVIDING MANAGED SERVICES," which is a conversion of, and claims a benefit of priority under 35 U.S.C. § 119 from U.S. Provisional Application No. 62/299,626, filed Feb. 25, 2016, entitled "SYSTEMS AND METHODS FOR PROVIDING MANAGED SERVICES," which are hereby fully incorporated by reference herein.

TECHNICAL FIELD

This disclosure relates generally to systems and methods for providing application services in a network computing environment. More particularly, this disclosure relates to managing such services, including client-side services that are local to a host managed container program running on a client device as well as server-side services that are remote to the host managed container. Even more particularly, this disclosure relates to systems and methods for extending secure managed service boundaries and providing software tools that interact with these boundaries such that services local and remote to a host managed container running on the client side can be managed in a consistent, efficient, and effective manner, including their interactions with an application gateway server application running on the server side.

BACKGROUND OF THE RELATED ART

In today's information technology, the term Enterprise Information Management (EIM) refers to a combination of various technical fields including Enterprise Content Management (ECM), Business Process Management (BPM), Customer Experience Management (CEM), and Business Intelligence (BI). EIM approaches information management from an enterprise perspective and seeks technical solutions for optimal use of information within enterprises. To this end, an EIM system may comprise disparate backend systems particularly configured for performing various functions within an enterprise. Skilled artisans appreciate that making these complex backend systems accessible to their end users can be extremely challenging. The exponential growth in mobile computing in recent years has added another layer of significant difficulty to an already complex problem.

SUMMARY OF THE DISCLOSURE

U.S. Patent Application Publication No. 2015/0089224, which is fully incorporated by reference herein, describes an application gateway server application that can, among other things, streamline communications among backend systems (e.g., EIM software systems such as ECM, BPM, CEM, BI and/or the like operating on server machines in an enterprise network environment) and client devices (e.g., user devices such as mobile devices, laptop computers, smartphones, etc.). Such client devices may operate inside and/or outside of an enterprise network environment and can communicate with backend systems running in the enterprise network environment in various ways (e.g., over a wired or wireless computer network, a cellular network, the Internet, or a combination thereof). Additional information on EIM applications can be found in a white paper published by Open Text in November 2013, entitled "AppWorks: The Power of EIM Applications," which is fully incorporated by reference herein.

The application gateway server application, referred to as an application gateway (AG), runs on a server computer or server computers that is/are part of an application platform and that is disposed at an edge (e.g., outside of the firewall) of an enterprise network. In this disclosure, an "application platform" refers to a combination of hardware and software particularly configured to host an application(s) and/or service(s). In this context, an application platform has hardware, an operating system, and coordinating programs that include computer-readable instructions for a particular processor or microprocessor. The backend systems as well as the client devices may operate on the same or different platforms (and hence on the same or different operating systems) and can authenticate through the AG.

According to embodiments, an AG can, on behalf of one or more backend systems connected thereto, control content (including applications) distribution to managed containers operating on client devices. Within this disclosure, a managed container refers to a special computer program for reviewing, accessing, and downloading applications via an AG. In this respect, a managed container can be considered an AG client. Because a managed container provides a secure runtime environment for any application received from an AG, it may also be referred to as a managed runtime.

According to embodiments, such a managed runtime or managed container can be downloaded from many sources, including an AG, a network site on a private network such as a company's intranet, or a public network such as the Internet. Examples of an appropriate source may include a service or an online store (which may, in some embodiments, be referred to as an "app store"). Additional information on the application gateway architecture and example implementations thereof can be found in U.S. Patent Application Publication No. 2015/0088934, which is fully incorporated by reference herein.

An AG according to embodiments includes application programming interfaces (APIs) and services configured for communicating with backend systems and with managed containers operating on the client devices. A managed container running on a client device can receive an application from an AG server computer (on which an AG operates), store the application and data associated with the application in a managed cache of the managed container, and control the managed cache in accordance with a set of rules propagated (via the AG) from the backend system to the managed container. All or some of the set of rules may reside on the client device, the backend system, the AG server computer, or a combination thereof. The downloaded application—and any data associated therewith—remains under the control of the managed container regardless of whether the client device has network connectivity (i.e., regardless of whether the client device is or is not connected to the AG server computer).

A managed container can extend content control beyond the confines of an enterprise computer network and control content at a client device (e.g., how a document is stored, accessed, updated, removed, etc.). For example, if a backend system (e.g., a content server, an information management system, a document repository, a business process management system, a social server, a records management (RM) system, etc.) has a policy or rule update, or a new rule on content retrieved from the backend system, the AG can broadcast the update or new rule to appropriate managed containers operating on various client devices or otherwise notify the appropriate managed containers about the update or new rule (appropriate in the sense that the content, to which the update or new rule is applicable, is stored in the managed caches of such managed containers). In this way, rules can be promulgated out to appropriate client devices by the AG and applied by the managed containers on those client devices to content living on the client devices without needing any help from applications associated with the content.

The services provided by or through an AG may include various types of services, for instance, services necessary for building new applications, converting documents, and/or services configured for integration of existing products. Mobile applications may be developed and deployed to client devices via an AG without having to go through external channels such as a third-party electronic application store on the Internet. The deployed mobile applications (which run on the client devices) can access resources at the backend via managed services provided by the AG. The AG, which resides at the edge of an enterprise computer network, can expose managed services and related data to client devices that reside beyond the enterprise computer network.

In this disclosure, services managed by an AG are referred to as managed services or AG services. Managed services include server-side applications that can provide support for client-side applications that run on client devices and that are managed by an AG. According to embodiments, these server-side applications can be developed and deployed to an AG server computer or AG server computers to augment and/or support various mobile applications. These capabilities make the AG architecture particularly suited for a managed Software as a Service (SaaS) implementation in a distributed computing environment (e.g., a cloud).

Embodiments disclosed herein can further improve the AG architecture by pushing secure managed service boundaries and providing computer-implemented tools that interact with these boundaries such that managed services that are local and remote to a host managed container program running on a client device can be managed in a consistent, efficient, and effective manner, including their interactions with an AG, thereby further enhancing the security, stability, reliability, and performance of the AG architecture. This technological improvement can be achieved, at least in part, by separating code for managed services from the AG code. In the improved solution disclosed herein, managed services that were previously available directly in the AG code are instead exposed to service clients in a controlled, secured manner via a RESTful API that is dedicated to the management and interaction of deployed managed services.

In this disclosure, "exposing a managed service" means that a managed service provided by or through an AG can be accessed and manipulated through a special Hypertext Transfer Protocol (HTTP) protocol interface. The HTTP protocol refers to an application protocol for distributed, collaborative, hypermedia information systems. The HTTP protocol is known to those skilled in the art and thus is not further described herein.

Because this interface can satisfy certain predefined conditions regarding representations of the managed service and states of the application through which the managed service is provided, this interface is referred to herein as a REST (or RESTful) API. For examples, a programmer such as an application developer could "expose" certain network resources such as managed objects (e.g., content items managed by a content server, records managed by a records management system, or database objects managed by a database management system operating at the backend of an enterprise network) by allowing end users to create, read, update, or delete them via a particular HTTP API. The HTTP API can adhere to a set of rules for interacting with an "exposed" managed service. Additionally, the API uses HTTP methods to indicate any desired action(s) to be performed relative to an identified managed service(s) (or other resources) and specifies how a managed service is to be identified/represented and how they could be manipulated through those representations.

With this RESTful API, an end user is provided with a representation of a managed service and is allowed to manipulate the representation of the managed service, but they may have no knowledge on how the managed service actually looks like (because the actual managed service is separated and abstracted away from the end user by the RESTful API).

This separation gives rise to the following:

The services clients and backend systems integration are now testable, increasing quality across the board. This is possible because the AG code is isolated from HTTP methods used by services clients to call managed services. As such, performance bench marks such as response time by a backend system to a managed service call from a services client can be tested without having to manipulate the AG code.

The behavior and deployment of managed services can now be observed and understood in a much cleaner and clearer manner, increasing transparency and efficiency of service deployment.

The observed information, which was not available or known before, can now be collected in a much more insightful way, allowing charting of metrics, reporting, etc., depending upon needs and/or utility. For example, an administrator at an AG can run analytics (e.g., via an analytics tool) on inbound HTTP API calls, for instance, to find out how often a services client makes a call and how many were made in a time frame. This information can provide an administrator of an AG with a valuable technical insight in the performance profile of the AG.

Computer-implemented tooling such as a service development kit (SDK) can be created around loosely coupled integration points, allowing managed services behind the integration points to evolve at their own pace using their own technology. For example, some services clients may use the SDK to create method calls directly to the host server(s) providing the managed service(s) instead of making HTTP API calls to an AG. This can help to take some load off of the AG and allow services clients the flexibility and options in how managed services are called. An example of a new AG server-side Java based SDK is described herein.

In some embodiments, a system for providing managed services may include a set of JavaScript toolkits particularly configured for performing a plurality of mobile application development tasks, including:

Data collection, geo location, all the code pieces supplied by a mobile application development framework such as Apache Cordova that allows for building native mobile applications using Hypertext Markup Language (HTML), Cascading Style Sheets (CSS), and JavaScript. HTML, CSS, and JavaScript are known to those skilled in the art and thus are not further described herein.

Secure data caching and storage.

Offline functionality that allows replay on connect.

Native push notification handling, passed from the native runtime wrapper direct to an app.

A command-line interface (CLI) built using industry standard tools that application developers use (Node.js, Node Package Manager (NPM), Bower etc.). Node.js is an open-source, cross-platform runtime environment for developing server-side Web applications. These Web applications are written in JavaScript (although Node.js is not a JavaScript framework) and can be run within the Node.js runtime on various platforms, including Linus, Microsoft Windows, and OS X. NPM can assist in the development and deployment of applications and management of application dependencies. Bower can be used for the installation and management of libraries and their dependencies.

In some embodiments, a system for managed services may also include an AG server-side Java based SDK. The AG SDK includes thin libraries for AG interaction from within a requesting service, as well as a rich set of handlers that can be implemented responsive to messages from a receiving service.

In some embodiments, a method for providing managed services may include receiving a web application at an application gateway server computer, injecting a management agent into the web application, and deploying the web application as a managed service in a particular area on the application gateway server computer. The management agent, which functions as a protection wrapper for the managed service and which runs on the application gateway server computer in the same dedicated area as the managed service, has access to communications to and from the managed service (by virtue of being in the same area as the managed service). The managed service operates within a logical deployment boundary that can extend beyond the physical boundary of the application gateway server computer and serves as a middle layer between the application gateway server computer and the web application. The application gateway server computer may be communicatively connected to backend systems. In some embodiments, the backend systems may comprise Enterprise Information Management (EIM) systems. As an example, the web application can be a client application of an EIM system.

In some embodiments, the method may further include the management agent intercepting a service request from an application to the managed service. In some embodiments, the management agent may determine which application gateway server application manages the managed service. In some embodiments, the management agent determines which application gateway server application manages the managed service utilizing an application gateway SDK within the managed service. In some embodiments, the SDK includes libraries and handlers for the managed service.

The management agent mediates all the communications between the managed service and a dedicated management application programming interface (API) layer of the application gateway server computer. In some embodiments, the management agent performs the mediation independently of whether the managed service is deployed to a location that is local or remote to the application gateway server computer. In some embodiments, the mediation includes the management agent making an API call to an API at the dedicated management API layer. The API, in turn, communicates with the application gateway server application (e.g., via HTTP method(s)). For example, the API may include an HTTP method for retrieving a list of enabled EIM connectors registered with the application gateway server application.

In response, the application gateway server application sends a control/configuration message to the management agent over the HTTP. The management agent controls and/or configures the managed service in accordance with the control/configuration message such that the managed service can function or behave as dictated by the application gateway server application.

In one embodiment, a system for providing managed services may comprise at least one processor, at least one non-transitory computer-readable storage medium, and stored instructions translatable by the at least one processor to perform a method substantially as described herein. Another embodiment comprises a computer program product having at least one non-transitory computer-readable storage medium storing instructions translatable by at least one processor to perform a method substantially as described herein. Numerous other embodiments are also possible.

Embodiments disclosed herein can provide many advantages. For example, the separation of managed services from the AG code can provide an added benefit of making the AG an even more cloud-friendly EIM solution.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 11A and 11B provide examples of dedicated management APIs according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
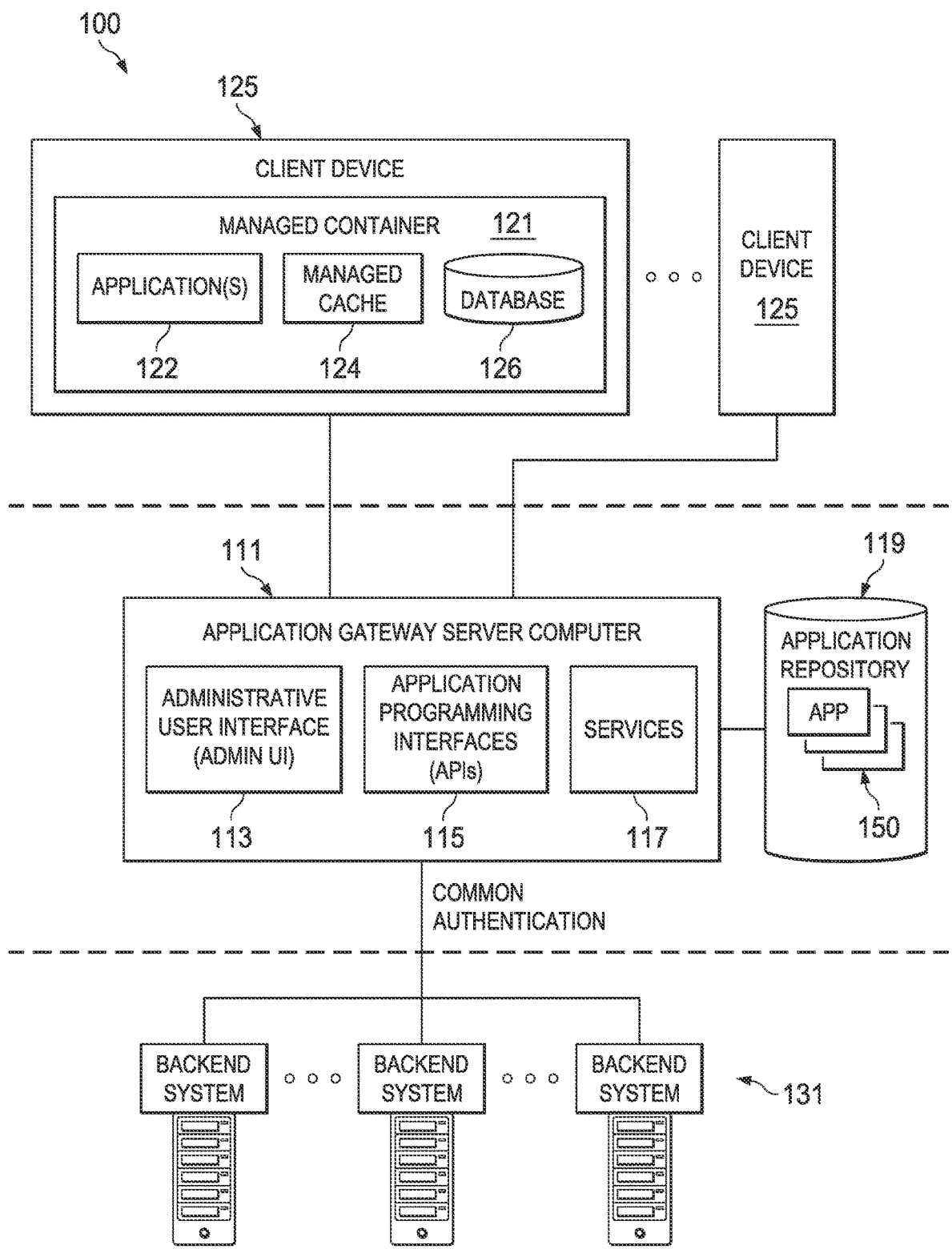
FIG. 1 depicts a diagrammatic representation of an example AG architecture according to some embodiments.

FIG. 1 depicts a diagrammatic representation of an example application gateway (AG) architecture. In the example of FIG. 1, system 100 may include application gateway server computer 111 communicatively connected to backend systems 131 and one or more client devices 125. Client device 125 shown in FIG. 1 represents various types of user devices. Those skilled in the art will appreciate that FIG. 1 shows a non-limiting example of client device 125. Backend systems 131 may comprise computer program products and/or applications developed within a company and/or by third party developers/companies. Non-limiting examples of backend systems 131 may include a content server, an information management system, a document repository, a process management system, a social server, an RM system, a database management system, an enterprise resources planning system, a collaboration and management system, a customer relationship management system, a search system, an asset management system, a case management system, etc.

As shown in FIG. 1, application gateway server computer 111 may include application programming interfaces (APIs) 115 and services 117 configured for communicating with backend systems 131 and managed containers 121 operating on client devices 125. In computer programming, an API has a set of routines, protocols, and tools. An API expresses a software component by its operations, inputs, outputs, and types. Together they define functionalities of the software component that are implementation-independent.

In some embodiments, applications 150 may be developed within a company and/or externally sourced and stored in application repository 119 accessible by application gateway server computer 111. Applications 150 may be associated with backend systems 131. Some applications 150 may be deployed as managed services (e.g., services 117).

Figure 2:
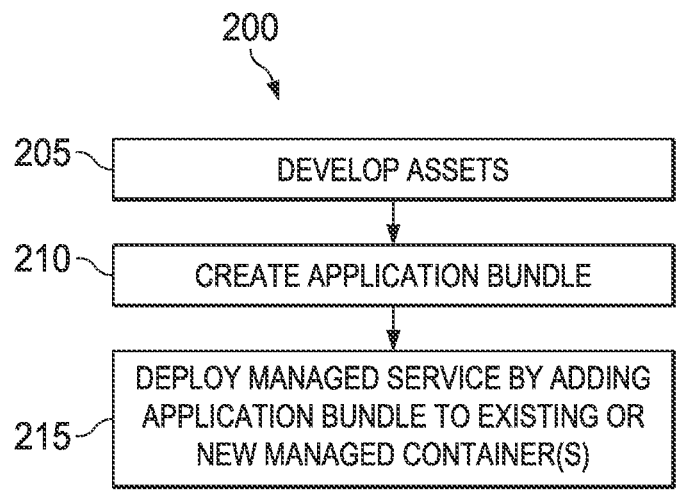
FIG. 2 shows an example of a process for developing and deploying a managed service according to some embodiments.

As an example, FIG. 2 shows process 200 for developing and deploying a managed service. In some embodiments, process 200 may include developing assets for an application to be deployed as a managed service (205). Examples of application assets can include at least a graphical asset (e.g., an image, an icon, a chart, a drawing, etc.), a HTML5 document with CSS, and a JavaScript. The developed assets are combined to form an application bundle (210). An example of an application bundle may be a zip file containing application data and configuration information (see e.g., FIG. 5). The application bundle can be stored in an application repository communicatively connected to an AG at the same content management layer (e.g., in application repository 119 communicatively connected to application gateway server computer 111 as shown in FIG. 1), between the content management layer at the client side (e.g., via managed containers running on client devices) and the content management layer at the server side (e.g., via backend systems such as EIM systems, content servers, etc.). The application bundle can be added as a managed service on the server side (e.g., by a build process instantiated by an AG) (215) and/or deployed to a managed container or containers on the client side as a thin web application or mobile application in various ways (220). For example, as further explained below with reference to FIG. 6, an AG may notify a managed container about a new application available for download. The managed container may operate to download the new application which, when invoked, utilizes the new managed service.

Figure 3:
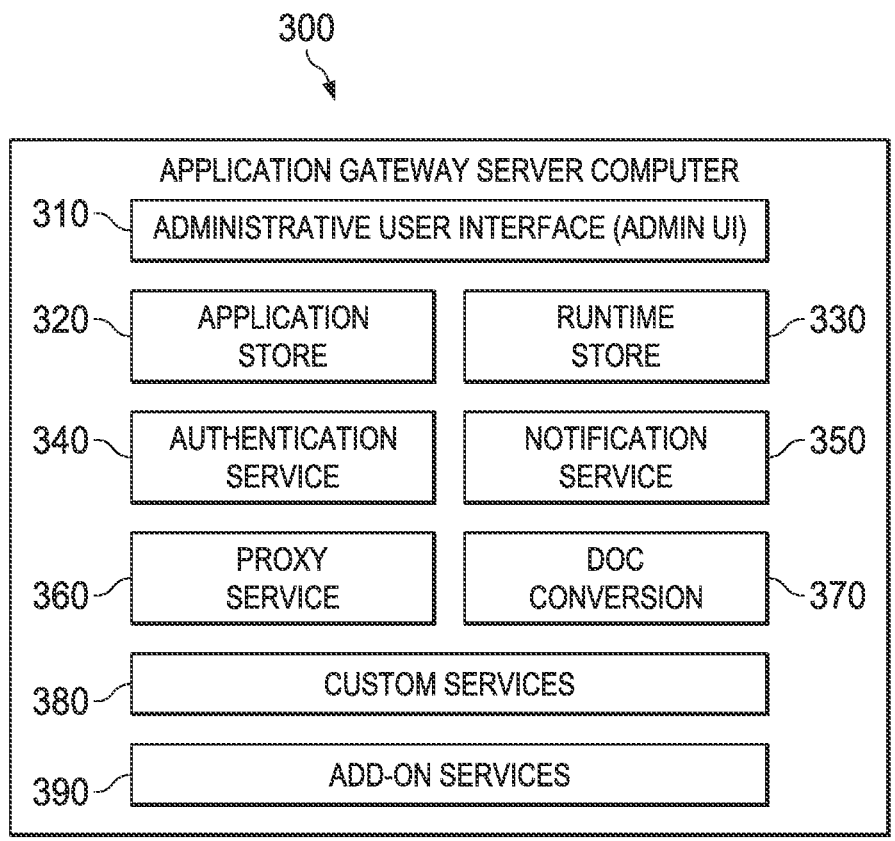
FIG. 3 depicts a diagrammatic representation of an example of an application gateway server computer with various components and services according to some embodiments.

FIG. 3 depicts a diagrammatic representation of an example of AG components and services according to some embodiments. In this example, application gateway server computer 300 may include a web server (e.g., a Tomcat) running administrative user interface 310, application store 320, runtime store 330, authentication service 340, notification service 350, proxy service 360, document conversion service 370, custom services 380, and add-on services 390. The web server can be clustered for high availability and scalability.

Administrative user interface 310 may implement an embodiment of administrative user interface 113 described above. In some embodiments, administrative user interface 310 may be a web based administration tool for application, service, device, and user management scenarios.

Application store 320 may store applications uploaded to application gateway server computer 300. As an example, an application developed by a third party can be uploaded to application gateway server computer 300 via administrative user interface 310.

Runtime store 330 may store managed containers configured to run on various types of user devices (e.g., desktop computer, mobile devices, etc.) These user devices may have different operating systems (e.g., IOS, Android, Windows, etc.). In some embodiments, runtime store 330 may operate to provide an over-the-air installation web page from which a managed container appropriate for a user's device can be downloaded from runtime store 330 and installed on the user's device.

Authentication service 340 may be configured to provide user account authentication utilizing a directory service such that a single user account can be authenticated across multiple services. An example of a directory service may be OpenText Directory Services (OTDS). OTDS is known to those skilled in the art and thus is not further described herein.

Notification service 350 may be configured to leverage the notification functionality of a user device to communicate with a managed container running on the user device. Via notification service 350, user-specific notifications can be pushed out to a managed container or managed containers via administrative user interface 310 or a trusted server.

Proxy service 360 may be configured for allowing application gateway server computer 300 to act as a proxy for existing APIs or full web pages from behind a firewall of an enterprise computer network. In cases where a reverse HTTP proxy may be required for some web services and web applications, proxy service 360 may allow application gateway server computer 300 to act as a reverse HTTP proxy. For example, typically, a web-based solution can access only certain sub-sections of a product's web service API. For example, consider OTDS RESTful web services, a network client of OTDS may wish to authenticate its user with the OTDS/authentication endpoint, but once authenticated, the network client may not wish its user to be able to call another resource endpoint such as the OTDS/user or/group resource endpoints as this will give them access to contents contained therein. In this scenario, with OTDS traffic routed through application gateway server computer 300, application gateway server computer 300 can prevent direct access to OTDS, and prevent access to certain parts of its managed services API while allowing access to others. This provides a technical effect of secure managed service APIs.

Document conversion service 370 may be configured for providing various document processing functions at application gateway server computer 300 and returning results to a requestor or requestors (e.g., a managed container running on a user device), without having to rely on a document server operating at the backend, behind an enterprise's firewall.

Custom services 380 may be configured for allowing application gateway server computer 300 to host any custom services, including those provided by an entity or entities external to the enterprise. Managed services disclosed herein may be hosted on premises of an enterprise, in a cloud (e.g., Open Text Cloud), or a combination thereof. By using proxy service 360, client software of application gateway server computer 300 only needs to be configured with a single URL—that of application gateway server computer 300, and managed service API calls are made to a path rooted by that URL regardless of what the ultimate destination might be. This provides a technical effect of a single point of entry, even if consumption of APIs from more than one managed service may be needed. Eliminating a need to consume managed service APIs from multiple hosts can streamline development and configuration of client software.

Add-on services 390 may be configured for allowing application gateway server computer 300 to add and host any compatible products and/or services.

Figure 4:
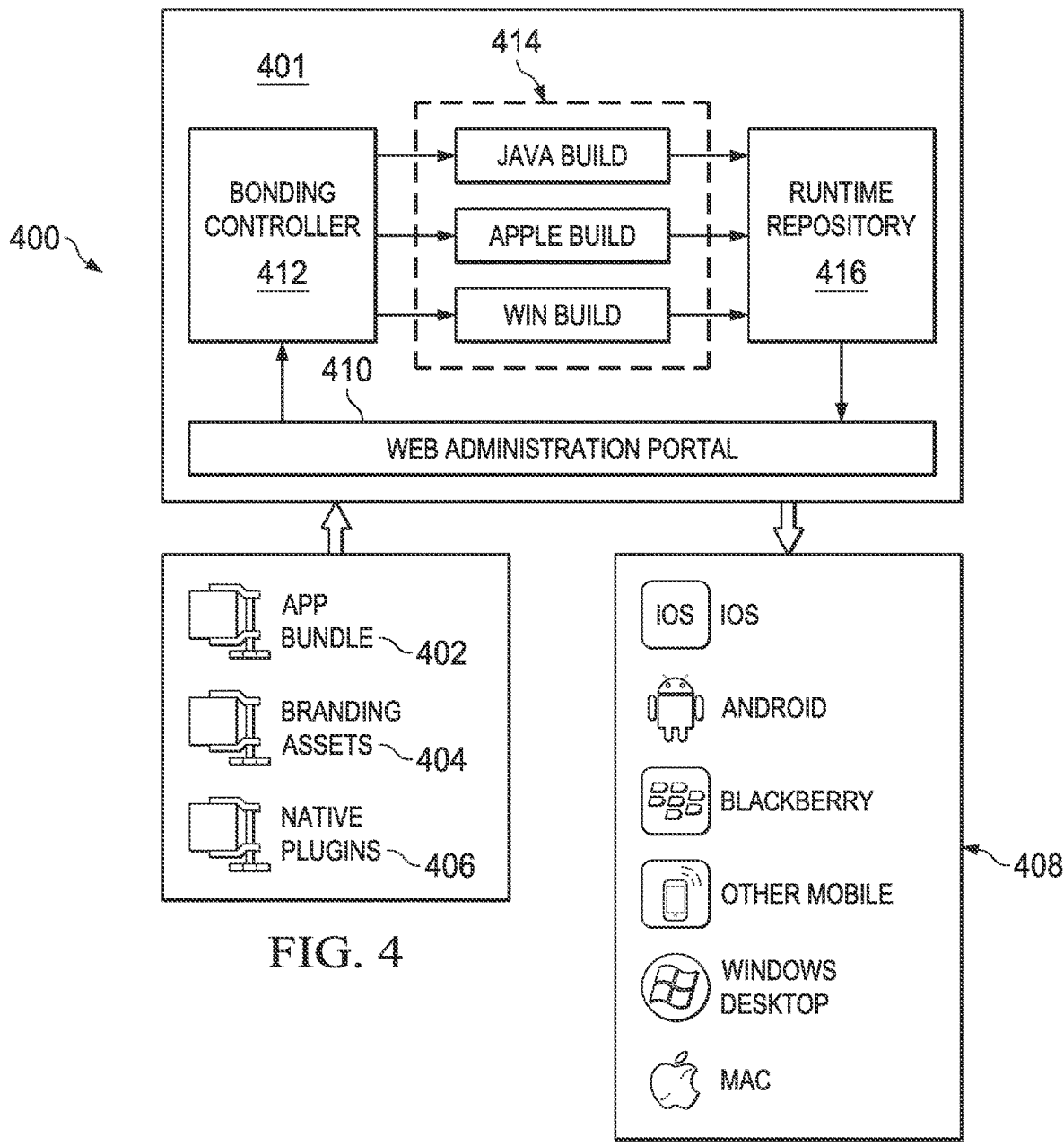
FIG. 4 depicts a diagrammatic representation of a process flow illustrating an example of an application development environment according to some embodiments.

FIG. 4 depicts a diagrammatic representation of a process flow illustrating an example of an application development environment for building managed containers (also referred to herein as managed runtimes) according to some embodiments. As an example, the application development environment can be implemented in a cloud such as one hosted by Open Text. An administrative user may upload application bundle 402, branding assets 404, and any native applicable plugins 406 to application gateway server computer 401 via web administration portal 410. Branding assets 404 and native applicable plugins 406 can be provided for a particular managed runtime by an entity external to or independent of application gateway server computer 401 to give the particular managed runtime a certain look and feel (e.g., for branding purposes). The uploaded application bundle 402, branding assets 404, and any native applicable plugins 406 may be communicated to bonding controller 412. Bonding controller 412 may instantiate appropriate build process(es) 414, each of which builds (or compiles) a particular managed runtime with the same look and feel for a specific platform (e.g., Java, Apple, Windows, etc.), and/or a type of user device 408, and stores the managed runtime thus built in runtime repository 416. As an example, runtime repository 416 can be an embodiment of runtime store 330 shown in FIG. 3.

Returning to FIG. 1, managed container 121 operating on client device 125 may consume APIs 115 exposed through managed services 117 of application gateway server computer 111. APIs 115 may include content server APIs, social server APIs, BPM APIs, etc. and may be provided to application gateway server computer 111 from sources internal and/or external to application gateway server computer 111, including third-party APIs.

In some embodiments, managed container 121 may include managed cache 124 for storing various applications 122 downloaded/pulled or received/pushed from application gateway server computer 111. All the data, documents, and files associated with applications 122 may be encrypted and stored in managed cache 124. To this end, managed cache 124 can be considered a local application repository that can provide client device 125 with offline access to cached applications 122. In some embodiments, database 126 may be used by managed container 121 to keep track of content stored in managed cache 124. Managed container 121 can be installed and run on client device 125 separate and independent of any applications that it manages.

Managed cache 124 may store the user interface components of applications 122. However, not all components of applications 122 may need to be stored in managed cache 124. For example, when an application is called (i.e., invoked by a user using client device 125 on which the application is installed), managed container 124 may obtain any data, document(s), and/or file(s) that the application needs from a backend system through application gateway server computer 111. This architecture provides many technical benefits, including reducing the storage requirement of having applications 122 on client device 125, expediting the network transmission of applications 122, and keeping applications 122 always up-to-date.

The content of managed cache 124 can be managed in accordance with a set of rules. The set of rules may include rules residing at one of more backend systems 131, rules residing at application gateway server computer 111, rules residing at client device 125, or a combination thereof. In some embodiments, the set of rules may include at least a data storage rule for controlling storage of the data associated with applications 122 received from application gateway server computer 111, a data policy rule for controlling access to the data associated with applications 122 received from application gateway server computer 111, an application rule for controlling at least one of applications 122 received from application gateway server computer 111, or an update rule for controlling update of the data associated with applications 122 received from application gateway server computer 111.

Managed container 121 may use a set of rules stored on client device 125 to control and/or protect the data associated with applications 122 received from application gateway server computer 111. For example, when an update to one of the rules is propagated from backend system 131 to managed container 121 via application gateway server computer 111, managed container 121 may execute, based on the updated rule, an update to the data associated with applications 122 received from application gateway server computer 111. As another example, managed container 121 may use a stored application rule to control application(s) 122 received from application gateway server computer 111.

At least one of the set of rules may determine encryption parameters for encrypting the content of managed cache 124. Managed container 121 may encrypt the content of managed cache 124 based on the encryption parameters. In some embodiments, the encryption parameters may be shared between managed container 121 and one or more backend systems 131, via application gateway server computer 111, to enable shared secure access to the data between and among applications 122 received from application gateway server computer 111 and one or more backend systems 131. Regardless of network connectivity of client device 125, applications 122 and the associated data stored in managed cache 124 are under control of managed container 121. In this way, unauthorized access to the data stored in managed cache 124 can be limited or prevented. Unauthorized access may include access by an operating system running on client device 125 and/or access by non-managed applications executing on client device 125 such as those downloaded onto client device 125 without going through application gateway server computer 111.

Skilled artisans appreciate that a central concept of web security is the enforcement of same-origin or known-origin policies. To mitigate security attacks, a web browser will not accept JavaScript code and other web artifacts unless those artifacts originate from the same host originally connected to the web browser at the beginning of the session, or from one of a set of named (and trusted) hosts. If a web-based solution has multiple web resources spread across different hosts, routing all client/server web API calls via application gateway server computer 111 allows the web-based solution to meet the same-origin policy requirement.

With system 100 described above, users (e.g., employees of a company operating or using an application gateway server computer) do not need to download or may not be allowed to download (e.g., from an online app store or a website on the Internet) any application into a managed container (although they may still download and install applications on their devices as usual—such applications are outside the scope of this disclosure). Rather, an administrator may, via administrative user interface 113 ("admin UI") load into managed containers on client devices associated with these users with select applications and/or services available on application gateway server computer 111. For example, an RM application may be needed to access an RM system, a search application may be needed to search a content repository, etc. Depending upon the role or job function of a user, one or more of these applications may be loaded into the managed container(s) on the device(s) associated with the user.

As described above, the managed container (a compiled managed runtime) can be downloaded and/or pushed from the cloud via admin UI 113. Through admin UI 113, an administrator may, for instance, select an application from application repository 119, select an appropriate deployment option from a plurality of deployment options, and/or perform one or more associated actions. For example, an administrator may designate an application to be deployed to a selected group of users such as employees in a human resources department or may designate the application as mandatory for everyone in an organization. Additionally, the administrator may configure an application, obtain information on an application, delete an application, edit an application, or take other appropriate action via actions (e.g., change or set permissions for one or more applications). In this way, admin UI 113 may provide a centralized application administration and configuration.

In some embodiments, users may be allowed to download certain applications into managed containers. Through admin UI 113, an administrator can control which user-downloaded applications can remain in the managed container, which should be updated, and/or which should be removed. Thus, an administrator can let a particular user go directly to an app store and attempt to download certain applications. However, through application gateway server computer 111 operating in concert with appropriate managed container(s) 121 running on client device(s) 125, the administrator can still control which applications can actually be downloaded by a particular user or group of users.

Figure 5:
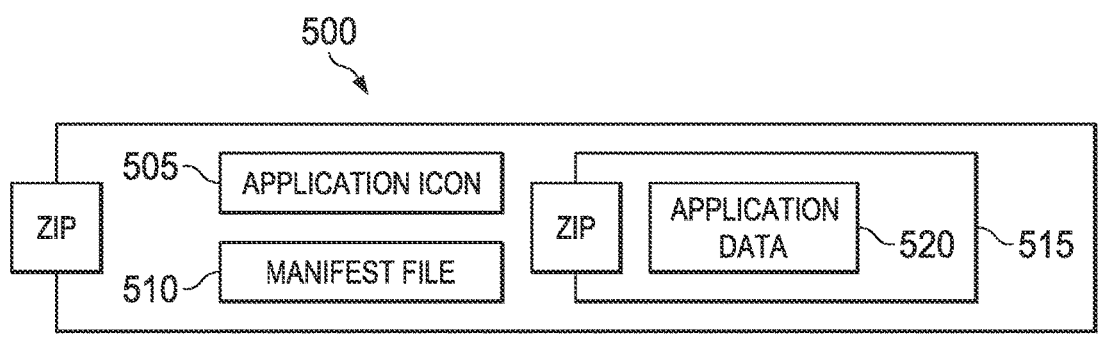
FIG. 5 depicts a diagrammatic representation of an example embodiment of an application bundle according to some embodiments.

According to embodiments, applications may be loaded or downloaded into managed containers via special application bundles. FIG. 5 depicts a diagrammatic representation of an example of an application bundle according to some embodiments. In some embodiments, an application sent from an application gateway server computer to a managed container may be realized via application bundle, package, or file 500.

In some embodiments, file 500 may be a compressed file (e.g., a zip file) and may contain application icon 505, properties file 510, and application data 520. Application data 520 may also be compressed into file 515 (e.g., mobile.zip) to reduce file size for fast network transmission. Application icon 505 may comprise an image file (e.g., Icon.png) containing an icon representing the particular application. Application data 520 may contain a configuration file (e.g., cordova.js) and/or one or more code files (e.g., index.html) associated with the particular application. The configuration file may include a short description of the particular application and one or more universal resource locator (URL) links to server-side resources. At least one of the one or more code files may be configured for communicating with an operating system running on the client device.

In some embodiments, application data 520 may comprise user interface components of the particular application. However, other components of the particular application may not be included. In some embodiments, when the particular application is called (i.e., invoked by a user selecting application icon 505 from within a managed container running on a client device), the managed container may obtain, via its secure shell, any data, document(s), and/or file(s) that the particular application may need from a backend system through an application gateway server computer.

In some embodiments, an application may be coded or written in a markup language used for structuring and presenting content for the World Wide Web on the Internet. As a non-limiting example, the markup language may conform to the fifth revision of the HyperText Markup Language (HTML 5) standard. Those skilled in the art will appreciate that embodiments are not limited to HTML 5 content and can include any HTML, XML, text, etc. content as well. In embodiments where an application is written in HTML/HTML 5, application data 520 may comprise associated HTML/HTML 5 application files.

Properties file 510 may be a metadata file (e.g., app.properties) containing service metadata (e.g., fields and values) about the particular application. Example fields may include:

displayName: Name that appears in the admin UI title
    description: Description shown in the admin UI and on devices
    version: The version number of the app
    type: app|service|eimconnector (the eimconnector type is a specialized service)

The values in the "displayName" and "description" fields are presented to end users in their apps, and to AG administrators in their respective admin UIs. The "type" field defines data type(s) and how settings are to be presented to a user.

The app.properties file can be used to internationalize certain properties that are displayed to end users in an AG admin UI. As an example, the displayName and description can be configured as shown below:

```
displayName.de=Testanwendung
description.de=Meine Testanwendung
displayName.zh-Hant=測試應用程序
description.zh-Hant=我的測試應用程序
```

The app.properties file can also be used to create configuration settings. Configuration parameters for a managed service may vary depending on what that service actually does. Some example configuration parameters may include service URLs (e.g., a content server URL), service/database credentials (e.g., an administrator's user name and password, an OTDS resource identifier, etc.), socket timeout values, thread pool size, etc. Example configuration settings can include:

```
url.type=string|password|multiline|integer|bool
url.displayName=My URL
url.description=My description
url.default=
url.seqNo=1url.readOnly=true|false
```

On deployment of a managed service, each setting contained in an app.properties file is created if it does not already exist. As an example, the setting identifier or key can be created using the name provided for the app via the service artifact (e.g., name_version.zip) and the property name value in the app.properties file. For example, if the zip file is named "myService_1.zip," a new setting with a key of "myService.url" can be created. Valid artifact names may have the following format: name_{numeric.separated.version}.zip, for instance, "myService_1.zip," "myService_1.2.0.zip," "myService_11.2.33.68.zip," etc.

Embodiments of client devices disclosed herein may operate on various platforms, including desktop, mobile, and web. In some embodiments, applications and components for desktop platforms are written in native binaries or HTML/HTML 5. In some embodiments, applications and components for mobile and web platforms are written in HTML/HTML 5. Accordingly, an application package such as file 500 may be implemented in various ways. For example, in some embodiments, an application package may include an icon, a metadata file, a configuration file, and at least one of a compressed file for a web platform, a compressed file for a mobile platform, or a compressed file for a desktop platform.

Once received, the managed container may extract the application (e.g., from file 500 shown in FIG. 5) and store the application and associated application data in its managed cache. As described above with reference to FIG. 5, at this point, the application stored in the managed cache of the managed container may comprise an icon, a manifest file, and some application data, sufficient for displaying the application within a user interface of the managed container, indicating to a user of the client device that the application is ready for use. In embodiments disclosed herein, the managed container controls the managed cache in accordance with a set of rules propagated from at least one of the backend systems to the managed container via the application gateway server computer. As discussed above, the set of rules or a portion thereof may reside on the client device, at the application gateway server computer, at the backend, or a combination thereof. In this way, when in use, access to the application can be controlled according to applicable rule(s) and, even when the application is not in use, the application and data stored in the managed cache can be protected by the managed container according to applicable rule(s).

As noted above, a user may still download and install applications on their devices as usual, allowing an application to connect with a backend system directly and bypassing embodiments of an application gateway server computer disclosed herein. However, such a client-server relationship (between an application installed on a user device and a backend system running on a server machine) has many drawbacks. For example, since such an application is not under the control of a managed container, the backend system may not retain control over the application, particularly when the user device may be offline. Furthermore, since data associated with the application is not stored in a managed cache, it is not protected by the managed container and thus may be vulnerable to unauthorized access by other applications and/or the operating system running on the user device. What is more, because the application communicates with the backend system directly and not through an application gateway server computer, it may not enjoy the many services provided by the application gateway server computer, including the authentication service. Accordingly, for each application that is not handled through the application gateway server computer, the user would need to authenticate with various backend systems separately.

Figure 6:
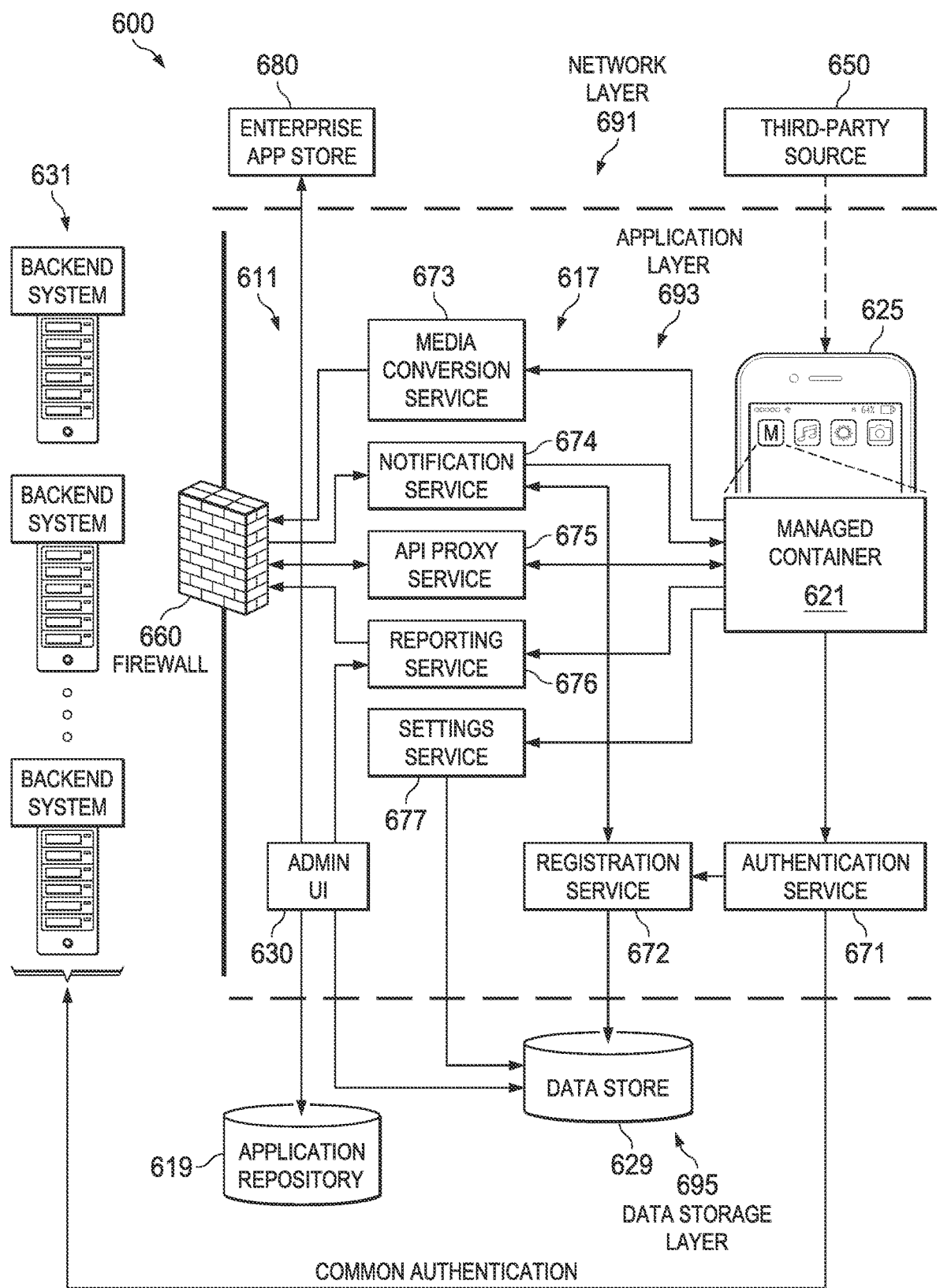
FIG. 6 depicts a diagrammatic representation of an example of an AG architecture in operation according to some embodiments.

An example of an application gateway architecture in operation will now be described with reference to FIG. 6. In this example, application gateway architecture 600 may include application gateway server computer 611 communicatively connected to a plurality of backend systems 631 through firewall 660 and a plurality of client devices 625. Additionally, application gateway server computer 611 may be communicatively connected to various storage devices at data storage layer 695, including application repository 619 and data store 629.

As described above, in some embodiments, a managed container may be implemented as an application (program) that is native to a client device, that can be downloaded from a source such as a website or an app store, and that can run on a client device separate and independent of any applications that it manages. In the example of FIG. 6, a user can download managed container 621 from various sources such as third-party source 650 (e.g., an online store on a public network such as the Internet) or enterprise app store 680 (e.g., a proprietary store on a private network such as a company's intranet) at network layer 691. Once installed, an icon associated with managed container 621 is displayed on client device 625, as shown in FIG. 6. Additional details of an example of a managed container are provided below with reference to FIG. 7.

As described above, managed container 621 can extend the capabilities of client device 625 by leveraging services 617 provided by application gateway server computer 611 at application layer 693. In some embodiments, web application archive (WAR) files may be used to package/install services 617 on application gateway server computer 611. Services 617 may vary from implementation to implementation, depending upon availability of backend systems 631. Non-limiting examples of services 617 provided by application gateway server computer 611 may include authentication service 671 for providing managed container 621 with common authentication mechanism 697 across backend systems 631 and requests for services 617 provided by application gateway server computer 611. Note that services 617 provided by application gateway server computer 611 are "reusable" and "common" to applications managed by managed container 621 in that services 617 can be leveraged by any of such applications. Once a user of client device 625 is authenticated by authentication service 671 (e.g., for an application running in managed container 621), managed container 621 has access to backend systems 631 and there is no need for the user to authenticate for other applications on client device 625 to access backend systems 631.

To authenticate, managed container 621 operating on client device 625 may first identify and authenticate itself in a connection request sent to application gateway server computer 611. In response, application gateway server computer 11 (via notification service 674) may send out a notification to managed container 621 using a notification listener or a push notification channel already established on client device 625. Push notifications and acknowledgement mechanisms are known to those skilled in the art and thus are not further described herein. Managed container 621 must be able to receive the notification from notification service 674 and respond accordingly. To be able to do so, managed container 621 must be registered with application gateway server computer 611.

In some embodiments, registration or enrollment service 672 may be provided for registering and identifying (for the purposes of tracking) a client device. Specifically, service 672 may provide common registration services to track connected client devices, track and manage client devices to enable remote wipe, block authentication for lost devices, notify a backend system on connection of a new client or device, provide a broadcast point for notification services 674, etc.

Accordingly, application gateway server computer 611 may enroll various managed containers using registration service 672 and place a certificate on an enrolled managed container. A registered/enrolled client device must report all fields required by an administrator (e.g., location, jailbreak status, device ID, etc.), implement a notification listener to receive messages from notification service 674, respond to notification messages with an acknowledgement when required (e.g., delete, remote wipe, hold, permission changes, etc.), and display and run all applications deployed from application gateway server computer 611. Jailbreak refers to removing limitations on certain highly controlled devices, such as the iPhone, manufactured by Apple Computer, Inc. of Cupertino, CA, so that root access can be gained to allow download of additional applications, extensions, and themes not officially available on the devices. Registration or enrollment service 672 may be integrated with reporting service 676 or it may be implemented separately. This certificate or token, which is issued by application gateway server computer 611, is in addition to the certificate(s) or token(s) issued by backend system(s) 631 such as a content server that a managed container is attempting to connect. To authenticate, therefore, managed container 621 would need to provide two certificates, tokens, or the like in order to connect through application gateway server computer 611 to backend system 631.

In some embodiments, a device management service may be implemented in conjunction with registration service 672. The device management service may communicate with managed container 621 to enforce a set of rules independently of any application received from application gateway server computer 611. Specifically, the device management service may communicate with client device 621 to ensure that it is registered with application gateway server computer 611 and that it obeys the rules. The device management service allows specific instructions such as a remote wipe command to be sent to a specific client device (e.g., using the media access control address or MAC address of the client device). The device management service may perform acknowledgement verification (e.g., via an acknowledgement channel) to determine if instructions were indeed received and/or performed by a client device.

Registration data (including the identification and credentials) associated with each registered managed container may be stored in data store 629. Data store 629 may comprise a central database storing configuration data used by application gateway server computer 611. Data store 629 may be managed using admin UI 630. Admin UI 630 may implement an embodiment of admin UI 113 described above with reference to FIG. 1. Data store 629 may further provide storage for services 617, including a server-side persistent storage (e.g., a settings repository) for settings received via settings service 677. The settings repository may store and maintain client configuration and state data, provide an extensible state framework for application developers, and enable application state to be persisted across devices and clients.

To respond to the notification and to authenticate with application gateway server computer 611, managed container 621 must send an acknowledgement or an acknowledgement with additional information (e.g., metadata that match the registration data associated with managed container 621 stored in data store 629). If managed container 621 does not acknowledge the notification, then application gateway server computer 611 will not allow managed container 621 to connect to backend system 631 using their API.

As those skilled in the art will appreciate, the above example is one of many types of notifications that may be provided by notification service 674. Indeed, using notification service 674, messages may be selectively sent from application gateway server computer 11 to appropriate managed containers operating on various client devices, to a specific application or applications contained in the managed container(s), to a particular backend system or systems, or a combination thereof. For example, notification service 674 can be used to let a managed container know that a certain application is not allowed on a particular client device and needs to be deleted from the managed container. As another example, notification service 674 can be used to send a message to a managed container indicating that files older than ten days are to be deleted but does not specify which files are older than ten days. The managed container, in response to the message, can determine which files under its management are older than ten days and delete them from its managed cache.

Once managed container 621 is authenticated, on the one hand, application gateway server computer 611 can notify the now authenticated managed container 621 about what applications should reside on the client device, what new applications are available for download, etc., in addition to managing connections to backend systems 631. On the other hand, managed container 621 can download an application (e.g., in the form of an application package or file as described above with reference to FIG. 5) from application repository 619, extract the content (the application and associated data) into a local file system on its managed cache, encrypt the extracted content, store the encrypted content in the secure managed cache, and drop an icon so that a reference to the application shows up in a user interface of managed container 625. As explained above with reference to admin UI 113 shown in FIG. 1, the deployment of an application may be made mandatory, selective, or optional by an administrator. Since the application is downloaded from application repository 619 into the managed cache, an update to the application published from application repository 619 can be downloaded to managed container 621 when the update is installed (e.g., by an administrator). Furthermore, the application can be removed from the managed cache when it is deleted or otherwise removed from application repository 619.

When the icon for the application is selected or otherwise invoked from within managed container 621, the application opens up an user interface on client device 625 and makes an API call (e.g., a JSON API call) to application gateway server computer 611 (using an appropriate certificate or token issued by application gateway server computer 611) to access backend system 631 (with an appropriate certificate or token issued by backend system 631). In some cases, API calls may be handled by API proxy service 675. In some embodiments, API proxy service 675 can be configured for communicating with (e.g., making JSON and/or HTTP API calls to) any backend system that does not explicitly support application gateway 611. In some embodiments, API proxy service 675 can be configured for communicating with external systems on another domain. API proxy service 675 may maintain a list of allowed and/or disallowed third party services (e.g., in data store 629).

In some embodiments, settings service 677 may be configured for providing a storage mechanism for settings comprising application defaults, user preferences (e.g., favorite documents, color scheme, etc.), and application state information such that these settings can be persisted (e.g., in data store 629) at the server side and consistent across the client devices and/or managed applications.

In some embodiments, content (e.g., documents, video files, etc.) from backend systems 631 may be processed at application gateway server computer 611, for instance, using media conversion service 673. In some embodiments, media conversion service 673 may be configured for controlling content quality, size, format, watermarking, or a combination thereof such that the content is consumable by particular client devices and/or per specific user preferences stored in data store 629. In some embodiments, media conversion service 673 may convert various types of content. For example, media conversion service 673 may convert a word processing document to a portable document format (PDF) to prevent changes and also watermark the PDF document. As another example, media conversion service 673 may be configured to produce only low resolution images, etc.

Note that, even if a user can open an application from within a managed container, they cannot do anything unless they have the appropriate certificate or token issued by the application gateway server computer. All the API calls that come in from client devices for connections through the application gateway server computer to the backend systems are handled by the application gateway server computer.

In an offline/disconnected scenario, the application may be opened and used (assuming such use(s) is/are allowed according to admin rules propagated from the application gateway server computer). There would still be an authentication check, but it would be based on the last set of cached credentials from the last valid authentication/connection with the application gateway server computer, due to the disconnected nature.

As described above, client devices may operate on various platforms, including desktop, mobile, and web. As an example, FIG. 7 depicts a diagrammatic representation of a managed container operating on a type of mobile device according to some embodiments.

Figure 7:
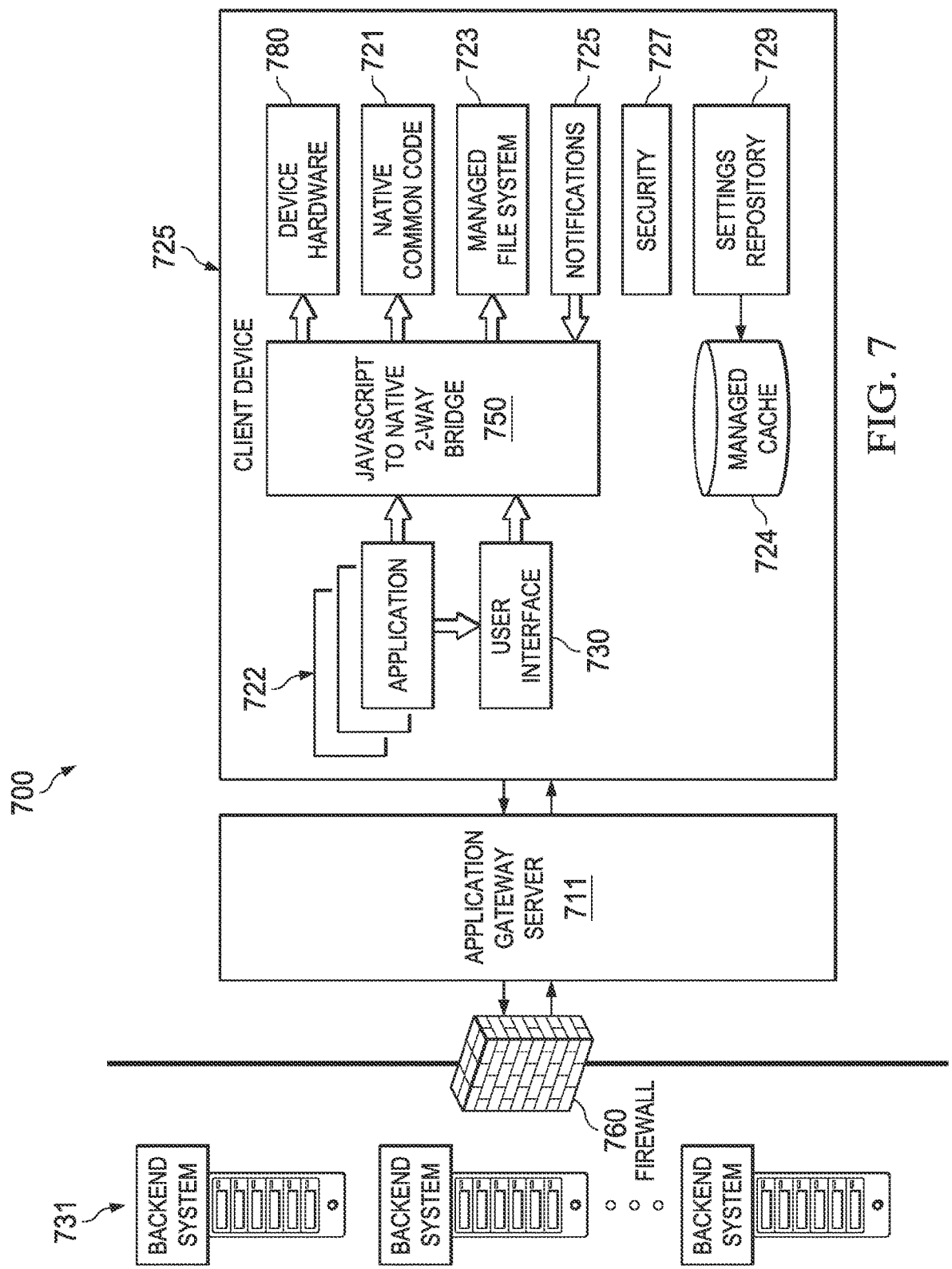
FIG. 7 depicts a diagrammatic representation of a managed container operating on a type of mobile device according to some embodiments.

In the example of FIG. 7, application gateway architecture 700 comprises application gateway server computer 711 communicatively connected to a plurality of backend systems 731 through firewall 760 and a plurality of client devices 725. Application gateway server computer 711 may implement an embodiment of an application gateway server computer described above. Client device 725 may implement an embodiment of a managed container described above.

As shown in FIG. 7, client device may include JavaScript to Native 2-Way Bridge 750 ("bridge 750") and device hardware 780. Device hardware 780 may include various hardware components commonly found on a mobile device such as a smart phone or a handheld or portable computing device. Bridge 750 may provide a common JavaScript API for interfacing the JavaScript side (e.g., applications 722, services provided by application gateway server computer 711, etc.) with the native (common) code in which a managed container is implemented ("managed container 721"). Bridge 750 may also interface with native device capabilities, including camera, native viewer, e-mail, contacts, GPS, etc. As explained above, applications 722 may be retrieved and/or received from application gateway server computer 711 and may not be available from commercial app stores on the Internet.

Acting as a native shell for applications 722 downloaded to client device 725, managed container 721 has knowledge (e.g., via managed file system 723) of where contents (applications 722 and data associated therewith) are stored in managed cache 724 and their corresponding settings in settings repository 729, can display a download progress bar on client device 725 via managed container user interface 730 (which includes common UI components in the native code), and can receive notifications 725 in the background and take appropriate action accordingly. For example, if an administrator wishes to restrict access to application 722 downloaded onto client device 725, notification 725 to remove application 722 can be sent to managed container 725, as described above, and managed container 721 will respond to notification 725 and delete application 722 from managed cache 724. All related metadata and applicable cached content will be deleted as well. Correspondingly, the icon for application 722 will disappear from user interface 730 of the managed container.

In some embodiments, user interface 730 may include reusable UI components that can be leveraged by any installed applications 722. Presentation of these reusable UI components determined by managed container 721 may provide native or intuitive user experiences. Non-limiting examples of reusable UI components for user interface 730 may include a browse list with a paging capability, form input controls, a server browse function, a user profiles and lookup function, a document viewer, etc.

In some embodiments, managed cache 724 may include an application cache and a document cache. The document cache is not limited to storing documents and may also contain other file types such as videos, photos, and so on. The application cache can be used by managed container 721 to manage applications on the client device and communicate with the application gateway server computer to access and/or update applications 722. The application cache may be configured with security 727 such that if managed container 721 is unable to communicate with the application gateway server computer, certain applications 722 stored in the application cache cannot be accessed. Another way to control access to applications 722 stored in the application cache may be done via device hardware 780. For example, managed container 721 may be configured to communicate with device hardware 780 to determine whether client device 725 has been "jail-broken" and, if so, operate to restrict access to certain applications and/or documents stored in managed cache 724.

The document cache can be used by managed container 721 to manage documents in a hierarchical manner (via managed file system 723) and control access to selected documents stored in the document cache. For example, when a user desires to open a document, an application associated with the document may call managed container 721. Managed container 721 may operate to determine, via security 727, whether the user has the proper permission to open the document and check to see if there is a version of the document already in managed cache 724. If so, managed container 721 may give that document to the application and make no calls to application gateway server computer 711. In some embodiments, managed container 721 may call application gateway server computer 711 with the appropriate certificates or tokens to connect through application gateway server computer 711 to backend system 731 to get an updated version of the document.

As described above, an AG can inject new applications directly into a managed container running on a client device and remotely manage (e.g., replace, update, change, repair, remove, etc.) any of the injected applications without going through any intermediary entity such as an online app store, website, or application developer. To this end, an AG according to this disclosure can advantageously provide a development and integration platform for the rapid creation, administration, and distribution of applications that can be deployed and centrally managed on a variety of mobile, desktop, and web platforms. From the perspective of entities, an AG according to this disclosure can provide a common point of authentication where one set of credentials can provide access to various backend systems. Furthermore, an AG according to this disclosure can provide a secure and managed enterprise information delivery channel for client mobile and desktop platforms. From the perspective of developers, an AG according to this disclosure can provide a standards-based integration platform with a "write-once, run-anywhere" application development environment. This further allows an AG according to this disclosure to be deployed on-premises or in a cloud computing environment.

An AG according to this disclosure includes APIs (e.g., APIs 115). Communications to managed services (e.g., deployed Java applications) are performed through an AG application which runs on a web server (e.g., Apache Tomcat). In some cases, direct method function calls to services, including those from managed containers as well as Java applications with proper credentials, may be embedded in the AG application code, resulting in the services communicating directly ("in process") with the core functionality of the AG. Embodiments disclosed herein separate managed services from the AG such that service boundaries can exist outside of the AG (and, as such, are no longer "in process" with the core functionality of the AG), while allowing the AG to control/manage services in a consistent, efficient, and effective manner.

Figure 8:
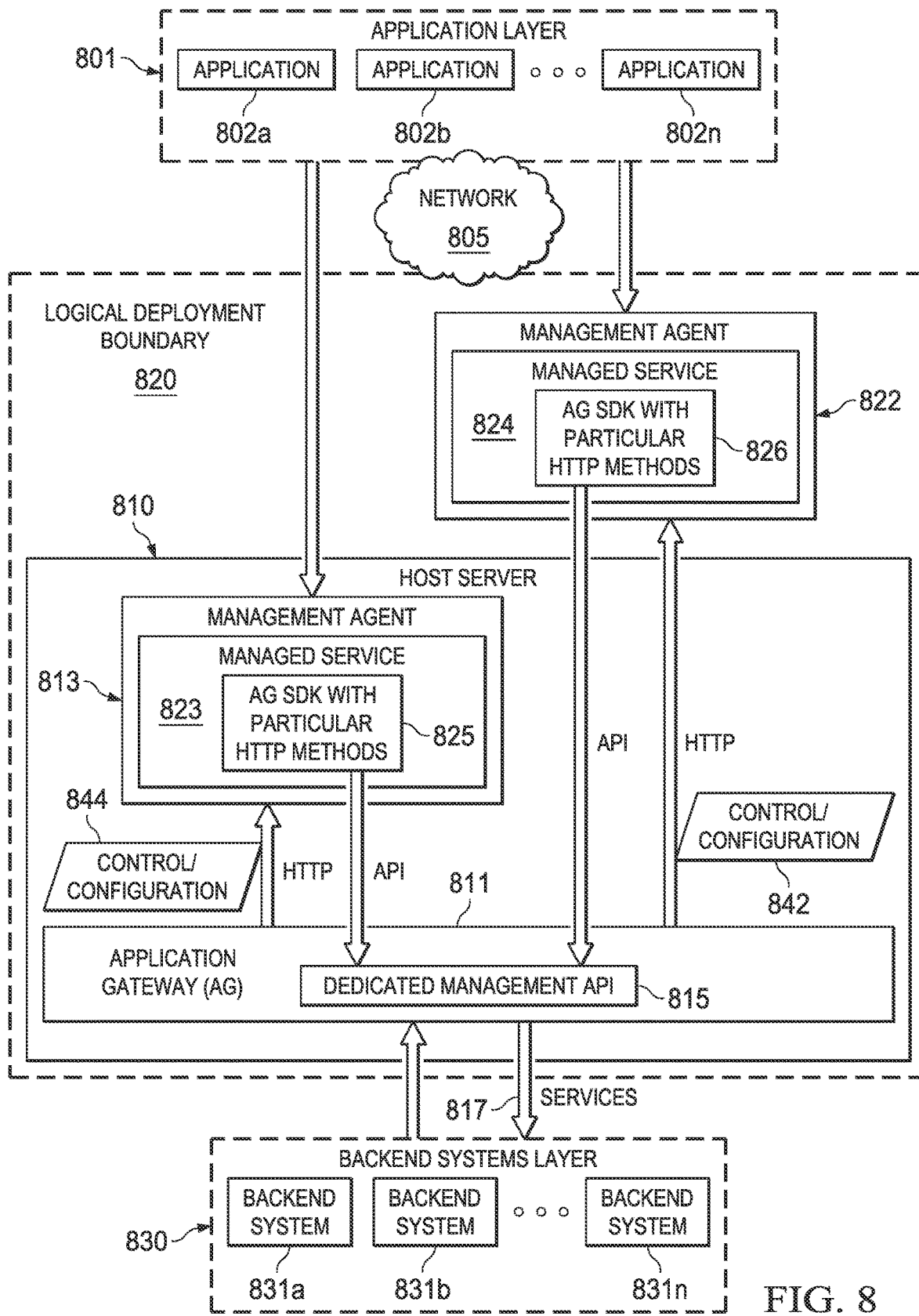
FIG. 8 depicts a diagrammatic representation of an example AG architecture with extended secure managed service boundaries and AG management agents that interact with these boundaries to facilitate control of service behavior according to some embodiments.

Referring to FIG. 8, host server 810 may be a web server hosting AG application 811 and a predefined API layer referred to as dedicated service deployment API or dedicated management API layer 815. Dedicated management API layer 815 may comprise a subset of the full AG administration APIs. Dedicated management API layer 815 may facilitate lower level services.

In the example shown in FIG. 8, AG 811 may communicate with backend systems 831a . . . 831n operating at backend systems layer 830 and provide services 817 to applications 802a . . . 802n operating at application layer 801. As illustrated in FIG. 8, AG 811 communicates with applications 802a . . . 802n through their management agents (MAs) such as MA 813 and MA 822.

In some embodiments, managed service 824 is managed by MA 822 injected into a Java application prior to deployment of the Java application as managed service 824. Likewise, managed service 823 is managed by MA 813 injected into a Java application prior to deployment of the Java application as managed service 823. Here, deployment refers to a process of installing a web application into a web server (in which the web application is converted to a Java application where necessary). Physically, MA813 resides at a location (e.g., on a non-transitory computer memory location) internal to host server 810 and MA822 resides at a location external to host server 810 (e.g., on another host server).

In some embodiments, a MA may include a special AG service development kit (SDK) that provides a consistent remote interaction for a managed service via a dedicated API layer on an application gateway server computer. The AG SDK provides access to a set of utility classes required to interact with an instance of an AG from a managed Service. It covers dedicated management API layer 815. In some embodiments, an AG SDK for a MA may provide the following features:

- Full set of REST clients for working with an AG's deployments API.
- Centralized configuration setting management (e.g., creation, update, handling changes from an AG's admin UI, portal, or console).
- Handling of service life-cycle events such as "service installed," "service upgraded," and "service uninstalled."
- EIM connector and custom authentication response modification/augmentation.

The AG SDK may, on the server side, aid in the development of solutions that integrate with other products. A set of Java-based lightweight tools allow developers to quickly build the pieces of an application to work with an AG and managed services that the AG offers. These AG SDK tools are considered lightweight due to their carefully considered dependencies that minimize interference to the application thus developed. To achieve this, the AG SDK has two distinct features. For service requests, the AG SDK provides classes from which a developer can instantiate. For example, a configuration setting "my.setting.key" can be directly retrieved as follows:

```
SettingsClient settingsClient = new SettingsClient( );
Setting mySetting = settingsClient.getSetting("my.setting.key");
```

For AG-to-service communication, the AG SDK allows a developer or developers to create classes that respond to messages from an AG. For example, to receive notifications upon settings being changed, the following implementation may be provided:

```
Public class MyHandler implements SettingChangeHandler {
...
@Override
public void onSettingChanged(SettingsChangeMessage message) {
    // do something with the updated value
}
...
}
```

Messages passed to a deployed service may include control messages, such as the enable/disable message, or informational messages, such as informing a particular managed service that one of the configuration settings it is interested in has been updated by an administrator in an AG admin UI. Message resolution and handling/routing is taken care of by a MA deployed with the managed service at issue, as described here.

In the example of FIG. 8, MA 822 includes AG SDK 826 and MA 813 includes AG SDK 825 for communicating with dedicated management API layer 815 via API calls. Control and/or configuration messages (e.g., control and configuration messages 842, 844) are communicated to a MA over HTTP for controlling how a managed service behaves when receiving input from the outside (e.g., an HTTP request over network 805 from a host managed container operating on a client device). In this context, an API at dedicated management API layer 815 can be defined as a set of HTTP request messages, along with a definition of the structure of response messages. The response messages (e.g., from AG 811) can be in an Extensible Markup Language (XML) or JavaScript Object Notation (JSON) format.

To respond to an AG when it is trying to communicate with a managed service, the AG SDK provides interfaces, annotations, and abstract implementations of message handlers that service developers can implement and/or extend. The AG SDK is operable to, on behalf of the service developer(s), register these handlers with a MA (and the managing AG) associated with the particular managed service. This allows the managed service to react accordingly. Such handlers can be picked up automatically by the MA when a single instance of an AG component type is instantiated and placed in an AG component context, which provides a very lightweight registry mechanism. This lightweight registry mechanism allows service developers to access handlers that they created from anywhere inside their service. As the AG component context is populated with handlers before the service startup message is passed, the instances of AG components (including the handlers) will be available on start. As an example, an instance of any AG component may be retrieved directly using "AGComponentContext#getComponent (java.lang.Class<T>)." As further described below, a number of handlers can be implemented to respond to messages from a managing AG.

Notice in FIG. 8, managed services such as AG service 824 are considered part of managed service deployment boundary 820, outside of host managed containers operating on client devices and essentially extending, if not redefining, the service boundary of services 817 provided through AG 811. This can be an important feature when pushing services into a cloud-based implementation, providing AG 811 platform-as-a-service and essentially allowing services to get into AG 811 with some level of remote control.

Figure 9:
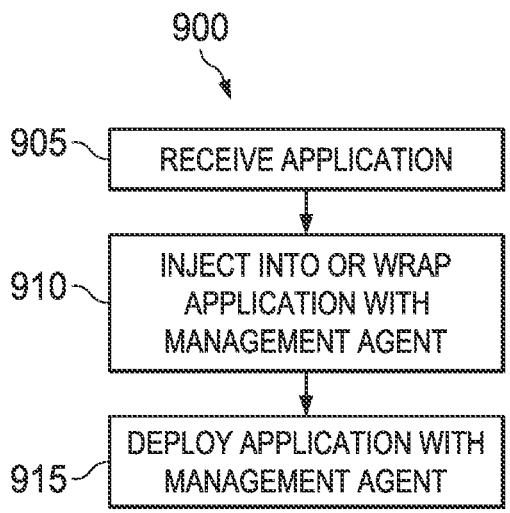
FIG. 9 depicts a flow chart illustrating an example method for preparing an application with an AG management agent for deployment according to some embodiments.

FIG. 9 depicts a flow chart illustrating example method 900 for preparing an application with an AG MA for deployment. The application may be developed within an enterprise network computing environment or provided by a third-party developer. The application may be written for providing a managed service. In some embodiments, an AG server computer may receive such an application (905) via a secure means such as an admin API. Where applicable, the received application may be converted into a Java application that can be deployed to client devices from the AG server computer. The received application can also be a server-side application that can be deployed to the AG server computer as a managed service to augment and/or support mobile applications.

In some embodiments, an AG MA can be injected into or otherwise implement to wrap the application code of the received application (910). The MA can be injected into a Java application in many ways, for instance, using standard Java server technology to create a framework and configure the framework for installation of the Java application as a service managed by the AG through the MA. The framework (i.e., the injected MA) provides a range of configuration properties which can be used to configure the application, for instance, using an XML tool or from the command line (e.g., via a CLI). Service configuration (also referred to as service metadata) can be stored in an application property file, for instance, in a designated web server directory. The application property file has metadata that describes the application (e.g., application properties). Example application properties may include a display name that appears in the admin UI, a description that is presented in the admin UI and on devices, a version of the application, and a service type that specifies how the application is to communicate with a backend system (e.g., via an EIM connector).

Using a browser application, an AG administrator may log into the AG's admin UI to view (new or updated) services that are not yet deployed. When the browser application loads a new or updated service, it reads the application property file stored in the web server directory. When the application property file is read, a bootstrap function may make a copy of the application sent to the AG and put it at a staging area, along with a job file and any pieces of data needed for later installation of the application. This has a technical effect that the application and the added features (including the MA) are moved to the web server directory for deployment.

Within a web server, deployment may be accomplished in a number of ways. For example, an application may be set up statically before a web server is started or dynamically using an application manager (which itself can be a web application). Such an application manager may be used interactively (e.g., via an HTML GUI) or programmatically (e.g., via a Universal Resource Locator (URL) based API) to deploy an application. As another example, deployment may be achieved using a command-line interface (CLI) tool to inspect, validate, compile, and package an application into a web application resource (WAR) file and deploy to a target server (e.g., the AG).

According to some embodiments, what can be installed at an installation stage may depend on what application property is loaded into the web server directory. The web server recognizes the new (or updated) service configuration in the web server directory (at this point, it does not matter whether the managed service is local or remote to the AG—they are treated the same way) and tries to bring it up on an HTTP server. At that time, the MA identifies itself to the AG and notifies the AG that it is awake (i.e., it has started) and begins to scan the deployment. The web server deploys the application to the AG (as a managed service) and the managed service starts within the deployment boundary of the AG, completing the installation process (915).

As illustrated in FIG. 8, a managed service may be considered as being local/internal or remote/external to the AG, depending upon the location where the managed service is deployed. However, logically, these managed services operate within the AG's service deployment boundary, as illustrated in FIG. 8. Furthermore, both local and remote types of managed services interact with a managing AG through their MAs. The MAs interact with a dedicated management API section of the AG in a specific way, using handlers provided in their internal SDKs. In some embodiments, the handlers may be configured for the following functions:

Application/service lifecycle
    Authentication request and response decoration
    Gateway service ready
    Settings and multi-setting changes Service developers may implement handlers interfaces or extend from the supplied abstract classes. On deployment, they are placed into service as part of what the framework injected into an application. Developers are expected to write handlers and include them in the service zip file for the application that they want to deploy. Note that some handling functions (also referred to as "handlers") may be implemented in a more generalized manner, for instance, authentication handling may be implemented by some service or server other than the application gateway (e.g., by a content server). In such implementations, authentication handlers can augment or modify authentication responses with cookies needed by their service or can be promoted to the primary authentication provider from the application gateway via the administration UI.

Below are some non-limiting examples of handlers. Service developers may also provide their own implementation of a handler interface.

Service Lifecycle Handlers

AGServiceContextHandler: This handler is informed when a managed service has started or stopped. It implements this interface to receive these callbacks and acts upon them. AG service clients and AG services in general communicate with their managing AG through HTTP/S. As its name suggests, the AG is protecting an entry point to a deployed managed service (which may be hosted at the backend of an enterprise computer network or another entity's network), so the AG is diligently managing exposed resources.

LifecycleCallbackHandler: This handler interface can be implemented to hook into the post-installation, post-upgrade/downgrade and pre-uninstall actions carried out by admin users via an AG admin UI.

Authentication Handlers

This handler is an interface that can be implemented to delegate authentication to a backend server other than OTDS. The handler provides means to handle a username/password combination, or a session ticket, which could be OTDS or some other identity provider's ticket. Implementations can optionally be annotated to indicate that they should be used to augment an initial response with data that will be delivered securely to a client as soon as a connection is established. This interface can be used as part of an EIM connector or independently.

Settings

SettingChangeHandler

Implementations of this interface can receive updates regarding changes made to AG configuration settings. When a managed service is started, any implementations of this handler found by the management agent for the managed service will be automatically registered with the managing AG for notifications about the configuration setting they are interested in. This can be defined by the handler's implementation of the getSettingKey method described above.

MultiSettingChangeHandler

As its name suggests, this is a similar handler to the SettingChangeHandler, but it is able to respond to multiple setting keys as opposed to one using the getSettingKey method. This handler can be used with its provided abstract implementation in the AG SDK, which offers the addHandler method. This method can take advantage of the Java 8 lambda syntax by allowing passing in a function as the handler.

Advanced AG Handlers

In some embodiments, an AG SDK may include advanced handlers particularly configured for rapid service development and integration with powerful information systems such as EIM systems, Content Server, etc. available from Open Text. Examples of advanced handlers may include EIM connectors, EIMConnectorClient, Custom Authentication Handlers, etc.

EIM Connectors provide a connection to a specific version of an EIM backend service. The connection it provides is the base URL of the service endpoint exposed by the EIM service to a managing AG. Multiple services can be built on top of an EIM system and they can share an EIM connector (URL) to the same EIM system. The EIM connector can provide the connection string, abstractions around custom authentication handling, and access to the managing AG (e.g., via a service-to-service functionality that provides an API key for the provider of the EIM service that the EIM service can use to identify itself to the designated management API layer of the managing AG). An EIM connector can contain or be associated with an authentication handler (so the authentication handler is part of the EIM service). However, authentication handlers can be deployed independent of EIM connectors.

EIMConnectorClient is an EIM connector client and is constructed by passing the name (e.g., "ContentServer") and the version of the connector (e.g., "10.5"). It has a "connect" method that can be called to attempt to retrieve the EIMConnectorService for the provided details. A connection result object is returned to the EIM connector client to let it know whether or not the connection was a success.

An authentication handler implementation can be the primary authentication mechanism for an AG once it has registered itself. In such a case, OTDS is not used and authentication requests are passed to the authentication handler implementation. The authentication service (with the authentication handler implementation as the primary authentication mechanism) can be safely disabled when the primary authentication mechanism is reset to OTDS or some other registered handler.

Figure 10:
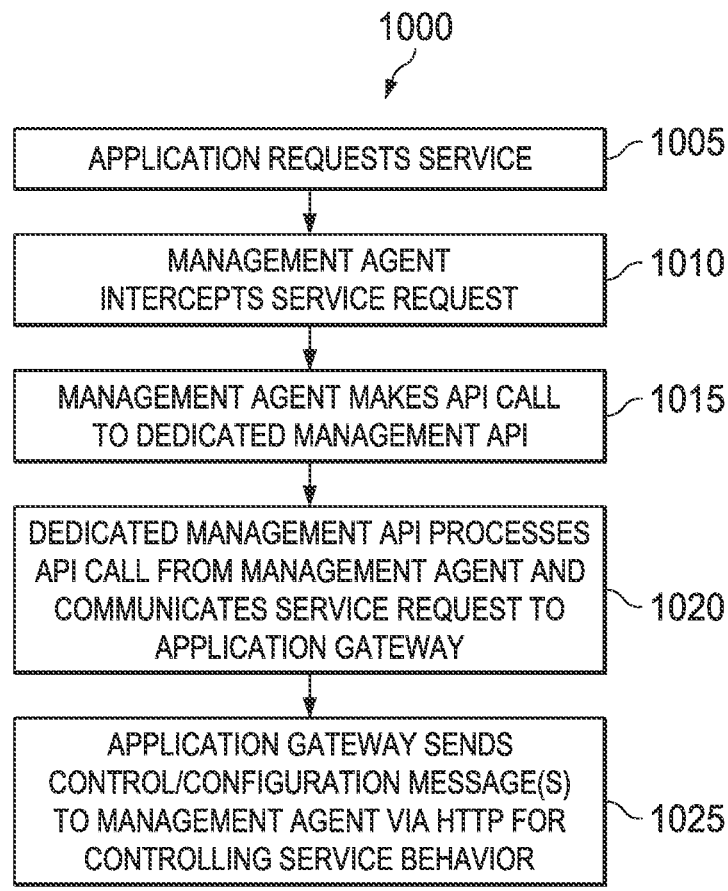
FIG. 10 depicts a flow chart illustrating an example operation of an AG management agent according to some embodiments.

FIG. 10 depicts a flow chart illustrating example operation 1000 according to some embodiments. Subsequent to deployment of a managed service (to an AG), an MA functions as a protection wrapper around the managed service and thus has access to communications to and from the managed service.

In some embodiments, an application (e.g., one that runs within a managed container on a user device) may request a managed service from an AG (1005). This causes an MA for the managed service to start.

The MA may manage, intercept, or otherwise communicate the service request to the managed service (1010). In some embodiments, this may entail the MA scanning the classes inside the managed service and instantiate any SDK implementations found in the managed service and adding them to the AGComponentContext described above. At this time, various handlers such as AGServiceContextHandlers and message handlers (e.g., configuration settings, authentication, service lifecycle, etc.) may be instantiated. When an AG is started and ready to serve requests over HTTP/S, the MA may check with the AG to determine if the requested service is enabled at the AG, register all configuration settings handlers with the AG to receive updates from the AG, and fire the startup handlers of registered AGServiceContextHandler implementations.

In some embodiments, the MA may utilize the SDK to determine which AG manages the managed service and an appropriate API address at that AG for the desired service (e.g., an EIM service). The API address may reside at a specific, dedicated management API layer of the AG (1015). For example, as illustrated in FIG. 8, instead of AG 811 directly communicating with applications 802a . . . 802n, API calls from MAs 813, 822 are received by dedicated management API layer 815.

Returning to FIG. 10, the API call from the MA is processed by a specific API at the dedicated management API layer. The API, in turn, communicates with the AG for the requested service (1020). In response, the AG sends a control/configuration message(s) to the MA over the HTTP (1025). The MA then controls and/or configures the service to function/behave as dictated by the AG.

In some embodiments, a dedicated management API layer may comprise a pre-defined layer of RESTful services. In Representational State Transfer (REST) services, resources are identified by global identifiers, for instance, using Uniform Resource Identifiers (URIs). Typically, client software uses HTTP methods (GET/POST/PUT/DELETE) to directly manipulate the resource or collection of resources. However, embodiments disclosed herein utilize different types of communication channels. In embodiments disclosed herein, a managed service (e.g., an application received at an AG server computer and deployed as described above) can register itself with an AG via the deployment service REST API over HTTP. When the managed service is requested, its MA interacts with APIs at a dedicated management API layer of an AG and the APIs, in turn, send HTTP request messages (e.g., a request to retrieve a list of enabled EIM connectors currently registered with the AG) and a definition of the structure of response messages (e.g., in XML or JSON) to the AG. In response, the AG sends response messages (e.g., a list of enabled EIM connectors currently registered with the AG) to the MA over the HTTP. The MA then uses the response messages to control and/or configure the behavior of the requested service. In this way, the code for implementing the service is separated from the code for the AG, further enhancing the security, stability, and performance of the AG architecture.

FIGS. 11A and 11B provide non-limiting examples of dedicated management APIs according to some embodiments. Skilled artisans appreciate that dedicated management APIs may vary from implementation to implementation and that additional and/or different APIs may be used at a dedicated management API layer of an application gateway described herein to facilitate interactions between enterprise backend systems and client software that use their assets/resources.

The MA interacts with the dedicated management API layer of the AG and performs all of the mediation between the application and the AG. In some embodiments, a MA may mediate the following services:

Identity
Mail
Notifications
Settings
Trusted providers

Information contained in an AG SDK can be considered a shared secret between a MA (which is deployed at an endpoint) and an AG. The MA interacts with the dedicated management API layer of the AG using this shared secret that only themselves and the AG are aware of to facilitate inter-service communications. As a security mechanism, no two MAs may communicate in the same way even with the same AG and only administrators can change settings contained in the AG SDK. To keep MAs stay abreast of changes, including where their managing AG resides (e.g., at a configured AG network address or URL), custom handler implementation may be provided by the AG to facilitate the communication without much thought from any developers. This setup also allows the AG to meter and audit service activities in a way that could not be done before.

Figure 12:
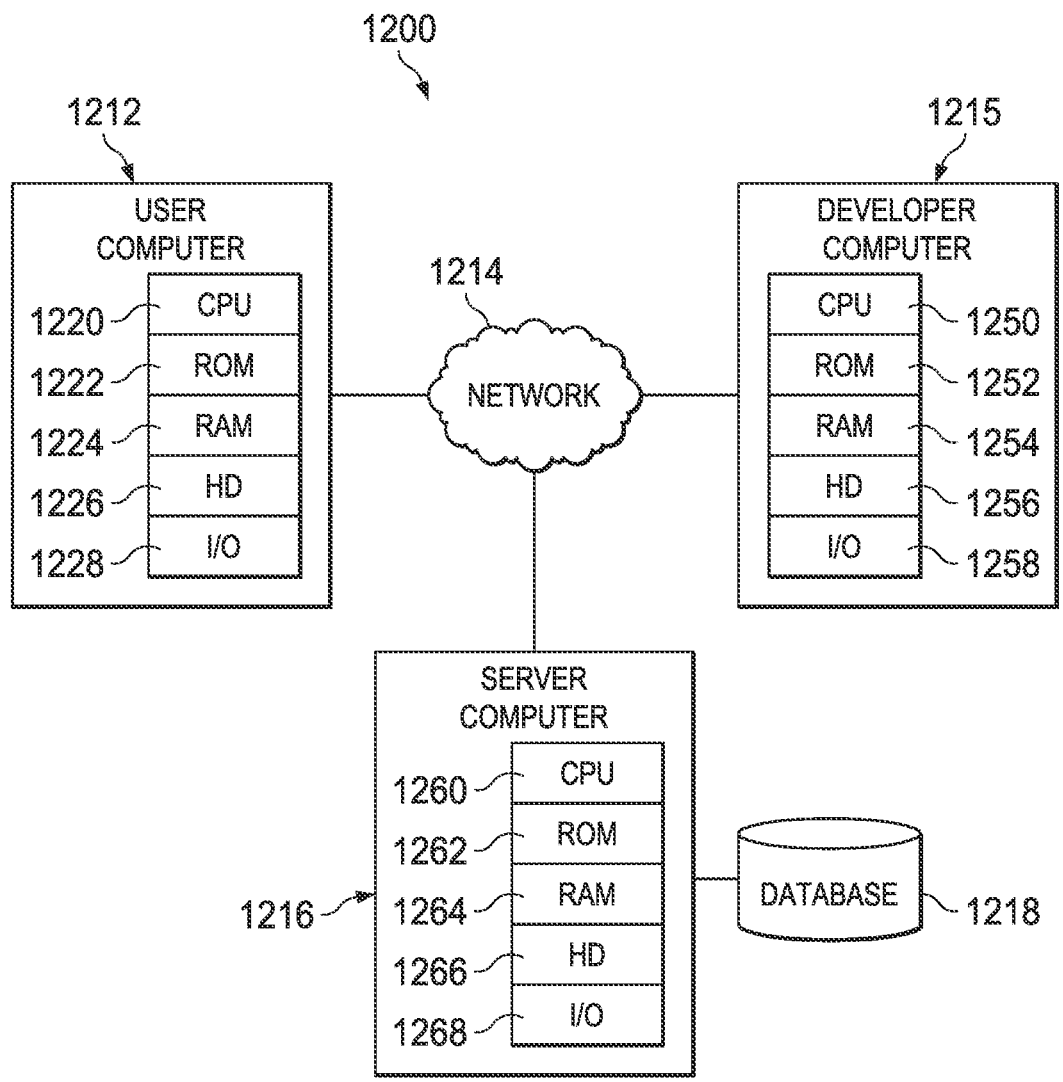
FIG. 12 depicts a diagrammatic representation of an example of an enterprise network computing environment where embodiments disclosed can be implemented.

FIG. 12 depicts a diagrammatic representation of an example of an enterprise network computing environment where embodiments disclosed can be implemented. In the example illustrated, network computing environment 1200 includes network 1214 that can be bi-directionally coupled to user computer 1212, service developer computer 1215, and server computer 1216. Server computer 1216 can be bi-directionally coupled to database 1218. Network 1214 may represent a combination of wired and wireless networks that network computing environment 1200 may utilize for various types of network communications known to those skilled in the art.

For the purpose of illustration, a single system is shown for each of user computer 1212, service developer computer 1215, and server computer 1216. However, within each of user computer 1212, service developer computer 1215, and server computer 1216, a plurality of computers (not shown) may be interconnected to each other over network 1214. For example, a plurality of user computers 1212 and a plurality of service developer computers 615 may be coupled to network 1214. User computers 1212 may include data processing systems for communicating with server computer 1216. Service developer computers 1215 may include data processing systems for individuals whose jobs may require them to configure services used by user computers 1212 in network computing environment 1200.

User computer 1212 can include central processing unit ("CPU") 1220, read-only memory ("ROM") 1222, random access memory ("RAM") 1224, hard drive ("HD") or storage memory 1226, and input/output device(s) ("I/O") 1228. I/O 1229 can include a keyboard, monitor, printer, electronic pointing device (e.g., mouse, trackball, stylus, etc.), or the like. User computer 1212 can include a desktop computer, a laptop computer, a personal digital assistant, a cellular phone, or nearly any device capable of communicating over a network. Service developer computer 1215 may be similar to user computer 1212 and can comprise CPU 1250, ROM 1252, RAM 1254, HD 1256, and I/O 1258.

Likewise, server computer 1216 may include CPU 1260, ROM 1262, RAM 1264, HD 1266, and I/O 1268. Server computer 1216 may include one or more backend systems configured for providing a variety of services to user computers 1212 over network 1214. One example of such a backend system can be a database management system for database 1218. Many other alternative configurations are possible and known to skilled artisans.

Each of the computers in FIG. 12 may have more than one CPU, ROM, RAM, HD, I/O, or other hardware components. For the sake of brevity, each computer is illustrated as having one of each of the hardware components, even if more than one is used. Each of computers 1212, 1215, and 1216 is an example of a data processing system. ROM 1222, 1252, and 1262; RAM 1224, 1254, and 1264; HD 1226, 1256, and 1266; and database 1218 can include media that can be read by CPU 1220, 1250, or 1260. Therefore, these types of memories include non-transitory computer-readable storage media. These memories may be internal or external to computers 1212, 1215, or 1216.

Portions of the methods described herein may be implemented in suitable software code that may reside within ROM 1222, 1252, or 1262; RAM 1224, 1254, or 1264; or HD 1226, 1256, or 1266. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method for providing managed services, comprising:
responsive to a service request from an application on a client device to a managed service provided by an application gateway server computer residing in an enterprise computer network, starting a management agent of the managed service, the managed service operating as a middle layer between the application gateway and the application on the client device;
making an application programming interface (API) call for the managed service requested by the application, the API call made by the management agent of the managed service to an API at a dedicated management API layer of the application gateway server computer, the management agent configured for mediating all communications between the managed service and the dedicated management API layer of the application gateway server computer, the management agent operating outside of the client device;
responsive to the API call for the managed service, communicating, by the API at the dedicated management API layer of the application gateway server computer, a request for the managed service to the application gateway server computer;
responsive to the request for the managed service from the API at the dedicated management API layer of the application gateway server computer, the application gateway server computer sending a message for the managed service to the management agent over a Hypertext Transfer Protocol (HTTP) connection, the message including information relating to how the managed service should behave when receiving requests over a network from the application; and based at least on the message for the managed service that the management agent received from the application gateway server computer over the HTTP connection, the management agent controlling or configuring the managed service such that the managed service functions or behaves as dictated by the application gateway server computer.

2. The method according to claim 1, wherein the management agent determines which application gateway server application manages the managed service and mediates communications between the managed service and the application gateway server application that manages the managed service, wherein the management agent is internal or external to a server machine on which the application gateway server application runs.

3. The method according to claim 2, wherein the determining utilizes an application gateway service development kit (SDK) within the managed service, the application gateway SDK including libraries and handlers for the managed service.

4. The method according to claim 2, wherein the management agent performs the mediating between the managed service and the application gateway server application independently of a location where the managed service is deployed, the location being local or remote to the server machine.

5. The method according to claim 1, wherein the application gateway server computer operates outside of a firewall of an enterprise computer network.

6. The method according to claim 1, further comprising:
receiving a new application at the application gateway server computer;
injecting the management agent in the new application; and
deploying the new application with the injected management agent on the application gateway server computer as a new managed service, the new managed service configured for servicing client devices communicatively connected to the application gateway server computer over a network.

7. The method according to claim 1, wherein the managed service operates within a logical deployment boundary, and wherein the logical deployment boundary extends beyond the application gateway server computer.

8. The method according to claim 1, wherein the application gateway server computer is communicatively connected to backend systems and wherein the backend systems comprise Enterprise Information Management (EIM) systems.

9. The method according to claim 8, wherein the API comprises an HTTP method for retrieving a list of enabled EIM connectors registered with the application gateway server application.

10. The method according to claim 1, wherein the application runs within a managed container on a user device, the managed container comprising an application gateway client.

11. A system for providing managed services, comprising:
a processor;
a non-transitory computer memory embodying a management agent; and
stored instructions translatable by the processor to cause the management agent to perform:
responsive to a service request from an application on a client device to a managed service provided by an application gateway server computer residing in an enterprise computer network, starting a management agent of the managed service, the managed service operating as a middle layer between the application gateway and the application on the client device;
making an application programming interface (API) call for the managed service requested by the application, the API call made by the management agent of the managed service to an API at a dedicated management API layer of the application gateway server computer, the management agent configured for mediating all communications between the managed service and the dedicated management API layer of the application gateway server computer, wherein the API at the dedicated management API layer of the application gateway server computer communicates a request for the managed service to the application gateway server computer, the management agent operating outside of the client device;
receiving a message for the managed service from the application gateway server computer over a Hypertext Transfer Protocol (HTTP) connection, the message including information relating to how the managed service should behave when receiving requests over a network from the application, the receiving performed by the management agent; and
based at least on the message for the managed service that the management agent received from the application gateway server computer over the HTTP connection, controlling or configuring, by the management agent, the managed service such that the managed service functions or behaves as dictated by the application gateway server computer.

12. The system of claim 11, wherein the management agent determines which application gateway server application manages the managed service and mediates communications between the managed service and the application gateway server application that manages the managed service, wherein the management agent is internal or external to a server machine on which the application gateway server application runs.

13. The system of claim 12, wherein the determining utilizes an application gateway service development kit (SDK) within the managed service, the application gateway SDK including libraries and handlers for the managed service.

14. The system of claim 12, wherein the management agent performs the mediating between the managed service and the application gateway server application independently of a location where the managed service is deployed, the location being local or remote to the server machine.

15. The system of claim 11, wherein the application gateway server computer operates outside of a firewall of an enterprise computer network.

16. The system of claim 11, wherein the instructions are further translatable by the at least one processor to perform:
receiving a new application at the application gateway server computer;
injecting the management agent in the new application; and
deploying the new application with the injected management agent on the application gateway server computer as a new managed service, the new managed service configured for servicing client devices communicatively connected to the application gateway server computer over a network.

17. The system of claim 11, wherein the managed service operates within a logical deployment boundary, and wherein the logical deployment boundary extends beyond the application gateway server computer.

18. The system of claim 11, wherein the application gateway server computer is communicatively connected to backend systems and wherein the backend systems comprise Enterprise Information Management (EIM) systems.

19. The system of claim 18, wherein the API comprises an HTTP method for retrieving a list of enabled EIM connectors registered with the application gateway server application.

20. The system of claim 11, wherein the application runs within a managed container on a user device, the managed container comprising an application gateway client.

* * * * *